(12) United States Patent
Willis et al.

(10) Patent No.: US 9,707,499 B2
(45) Date of Patent: Jul. 18, 2017

(54) VERTICAL SLIDE BACKWASH VALVE

(71) Applicant: Hayward Industries, Inc., Elizabeth, NJ (US)

(72) Inventors: Vance Elliot Willis, Nunnelly, TN (US); Benjamin Isaac Corn, Nashville, TN (US); Kenneth Harvey Durham, Spring Hill, TN (US); Michael Damion Mercer, Nashville, TN (US)

(73) Assignee: Hayward Industries, Inc., Elizabeth, NJ (US)

( * ) Notice: Subject to any disclaimer, the term of this patent is extended or adjusted under 35 U.S.C. 154(b) by 43 days.

(21) Appl. No.: 14/206,374

(22) Filed: Mar. 12, 2014

(65) Prior Publication Data

US 2014/0263003 A1 Sep. 18, 2014

Related U.S. Application Data

(60) Provisional application No. 61/798,448, filed on Mar. 15, 2013.

(51) Int. Cl.
  *B01D 29/66* (2006.01)
  *E04H 4/16* (2006.01)

(52) U.S. Cl.
  CPC .............. *B01D 29/668* (2013.01); *E04H 4/16* (2013.01); *Y10T 137/86549* (2015.04);
  (Continued)

(58) Field of Classification Search
  CPC . E04H 4/16; B01D 29/668; Y10T 137/86879; Y10T 137/87249; Y10T 137/87161; Y10T 137/86549
  (Continued)

(56) References Cited

U.S. PATENT DOCUMENTS

| | | | |
|---|---|---|---|
| 3,195,726 A | | 7/1965 | Saurenman et al. |
| 4,579,143 A | * | 4/1986 | Rollins ............... F23K 5/147 |
| | | | 137/238 |

(Continued)

OTHER PUBLICATIONS

International Search Report of the International Searching Authority mailed on Jul. 7, 2014, issued in connection with International Application No. PCT/US2014/024426, corresponding to U.S. Appl. No. 14/206,374 (2 pages).

(Continued)

*Primary Examiner* — Michael R Reid
*Assistant Examiner* — Christopher Ballman
(74) *Attorney, Agent, or Firm* — McCarter & English, LLP

(57) ABSTRACT

Provided is a backwash valve comprising a body including a central tube extending along a length of the body, a first pool port and first filter port axially aligned at a first position along the body length, a second pool port and second filter port axially aligned at a second position along the body length, and a waste port; and a sliding gate including a stem connected to a gate body, the gate body including first and second chambers separated by an internal wall; the sliding gate movable between a filter position wherein fluid communication is provided among the first filter port, first chamber, and first pool port, and a backwash position wherein fluid communication is provided among the first filter port, second fluid chamber, and second pool port, and between the second filter port and waste port.

20 Claims, 16 Drawing Sheets

(52) U.S. Cl.
CPC .................. *Y10T 137/86879* (2015.04); *Y10T 137/87161* (2015.04); *Y10T 137/87249* (2015.04)

(58) Field of Classification Search
USPC .............. 137/270, 595, 597, 625.17, 625.48; 210/167.14, 278, 425
See application file for complete search history.

(56) References Cited

U.S. PATENT DOCUMENTS

| | | | |
|---|---|---|---|
| 5,301,712 | A | 4/1994 | Treichel et al. |
| 5,937,903 | A | 8/1999 | Afshar et al. |
| 6,568,428 | B2 | 5/2003 | Pecci et al. |
| 6,575,195 | B2 * | 6/2003 | Wichmann ............ F16K 11/076 137/625.17 |
| 7,017,886 | B1 | 3/2006 | Ngene-Igwe |
| 7,261,127 | B1 | 8/2007 | Oundjian |
| 2006/0048828 | A1 | 3/2006 | Moreno et al. |
| 2008/0063465 | A1 | 3/2008 | Lang et al. |

OTHER PUBLICATIONS

Written Opinion mailed on Jul. 7, 2014, issued in connection with International Application No. PCT/US2014/024426, corresponding to U.S. Appl. No. 14/206,374 (7 pages).

"Owner's Guide Filter Control Slide Valve," Hayward Pool Products, Inc. (copyright 1995) (2 pages).

"Hayward 2013 Buyer's Guide and Parts Price List," Hayward Industries, Inc., cover, inner cover, pp. 264-267, and back cover (copyright 2012) (7 pages).

"Jandy Pro Series Slide Valve and Backwash Valve," Zodiac Pool Systems, Inc. (copyright 2012) (12 pages).

"Jandy Pro Series Never Lube® 2"-2-1/2" Three Way CPVC Valve Installation Instructions," Zodiac Pool Systems, Inc. (copyright 2012) (2 pages).

Prinout of webpage: https://web.archive.org/web/20100725073444/http://www.inyopools.com/parts_pentair_push_pull_valves.aspx, "Pentair Push Pull Valves" (webpage dated Jul. 25, 2010 via the Internet Archive) (4 pages).

Printout of webpage: https://web.archive.org/web/20100115141758/http://www.pentairpool.com/partslists/valves-fullflow-valves-264.htm, "FullFlow Valves Replacement Parts" (webpage dated Jan. 15, 2010 via the Internet Archive) (2 pages).

"FullFloXF Backwash Valve Installation and User's Guide," Pentair Water Pool and Spa, Inc. (dated Apr. 19, 2012) (12 pages).

"2-1/2" Slide Valve Installation Guide," Waterway Plastics (copyright 2008) (2 pages).

Printout of webpage: https://web.archive.org/web/20120309235426/http://www.waterwayplastics.com/products/pool-products/valves/top-mount-sand-filter-valves, "Top-Mount Sand Filter Valves" (wepage dated Mar. 9, 2012 via the Internet Archive) (2 pages).

"Jandy Backwash Valves," Zodiac 2010 Catalog, pp. 48-49 (1 page).

"Meteor High Rate Sand Filter Owner's Manual," Pentair Pool Products (Rev. D Apr. 20, 2012) (10 pages).

\* cited by examiner

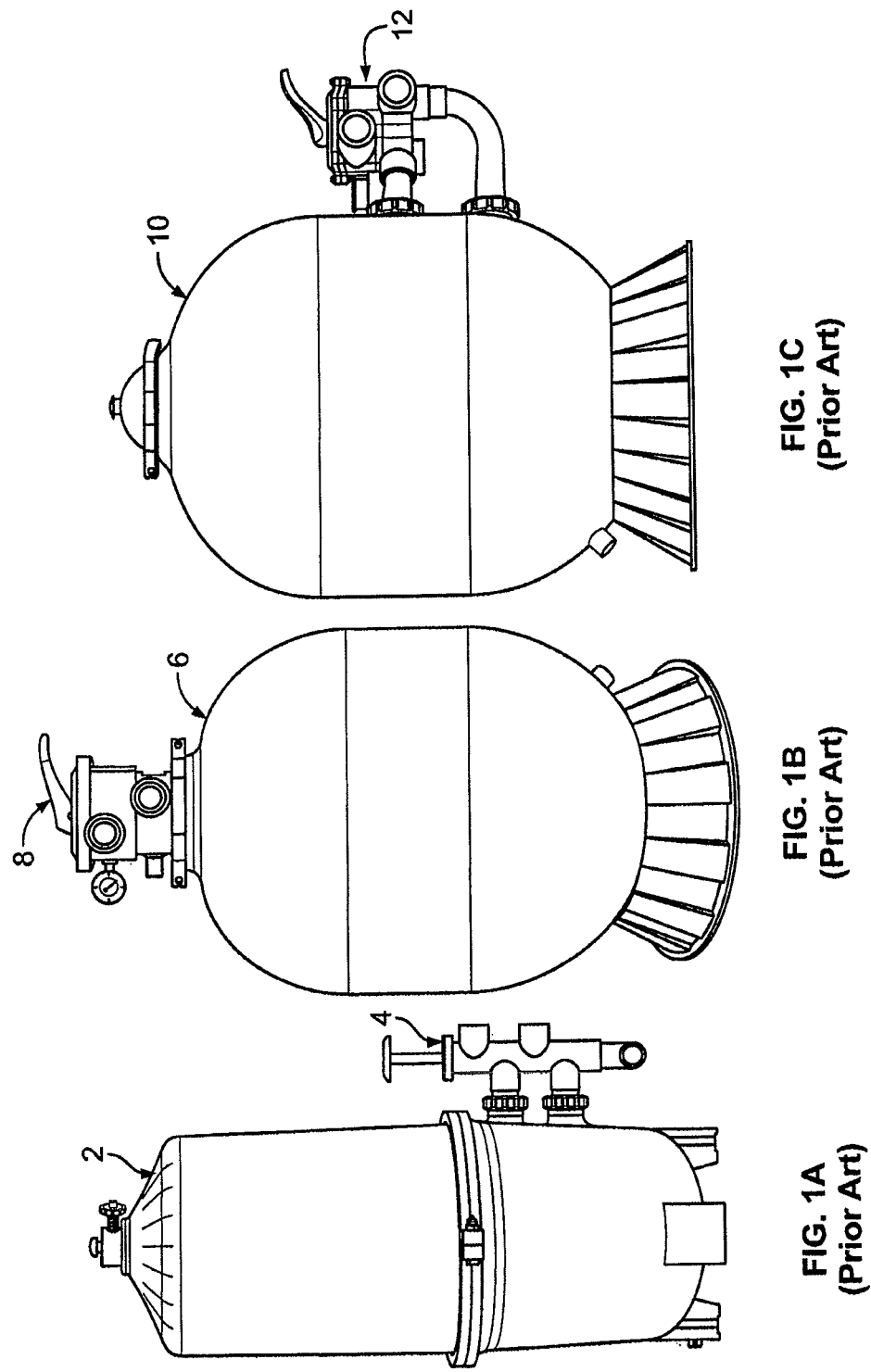

VERTICAL SLIDE BACKWASH VALVE

CROSS-REFERENCE TO RELATED APPLICATIONS

This application claims the benefit of priority to U.S. Application No. 61/798,448, filed on Mar. 15, 2013, the entire disclosure of which is expressly incorporated herein by reference.

BACKGROUND

Technical Field

The present disclosure relates to a vertical slide backwash valve, and, more specifically, to a vertical slide backwash valve for reversing fluid flow through a filter body.

Related Art

Swimming pools and spas generally include water filters for cleaning the pool/spa water during circulation. Typically, these water filters include a filter body containing a filter media, such as sand or diatomaceous earth (DE). It is necessary to periodically reverse the fluid flow through such filters to clean and/or flush the media to a waste location where the flushed water is expelled to. This activity is referred to as backwashing. To facilitate switching the filter between the standard operating mode, e.g., "filter mode," and the "backwash mode," a backwash valve can be provided on the filter that alters the flow path of water based on the desired mode.

FIG. 1A is a perspective view of an exemplary DE filter 2 with a vertical slide backwash valve 4 of the prior art. The vertical slide backwash valve 4 is generally mounted on the side of the DE earth filter 2, and can have a narrow, vertical form. Alternatively, a filter may have a multiport backwash valve attached thereto, which is generally bulkier and can be mounted on the top or side of a filter body. For example, FIG. 1B is a perspective view of a sand filter 6 with a top-mounted multiport backwash valve 8 of the prior art, while FIG. 1C is a perspective view of a sand filter 10 with a side-mounted multiport backwash valve 12 of the prior art.

To categorize backwash valves, one might look to how a user operates the valve handle and the movement of the valve. For example, exemplary categories can generally include sliding valves, rotating valves, etc. Sliding valves are generally compact and can have a lower cost compared to rotating valves, but might not be very hydraulically efficient. In contrast, rotating valves can be hydraulically efficient due to a line-of-sight straight-through flow path when in filter mode, but generally can be larger and have a greater cost when compared to sliding valves. Some sliding valves and rotating valves can utilize seals generally made of rubber to prevent leaking from the waste port during filter mode. However, when the valves are actuated between filter mode and backwash mode, the seals can generally experience sliding friction that causes wear. Accordingly, lubricant might be applied to the seals. However, applying lubricant to the seals can, in some instances, damage the seals because it can cause dirt and debris to attach to the seals, which generally further accelerates the wear.

FIGS. 2A-2D demonstrate the vertical sliding backwash valve 4 of FIG. 1A in greater detail. FIG. 2A is a side elevational view of the vertical sliding backwash valve 4. The vertical sliding backwash valve 4 includes a body 12, an end cap 14, a waste outlet 16, a handle 18, a stem 20 (shown in FIGS. 2C-2D), and a spool 22 (shown in FIGS. 2C-2D). The body 12 includes a first end 24, a second end 26, a central tube 28, a first pool port 30, a second pool port 32, a first filter port 34, and a second filter port 36. The end cap 14 is connectable to, and forms a fluid tight seal with, the first end 24, while the waste outlet 16 is connectable to, and forms a fluid tight seal with, the second end 26. The first and second filter ports 34, 36 can each include a nut 38 that is engageable with a port of a filter to secure the first and second filter ports 34, 36 with the filter's ports. The first and second pool ports 30, 32 are connectable with the fluid circulation system of a pool/spa. Specifically, the second pool port 32 can receive fluid from the pool/spa while the first pool port 30 can return fluid back to the pool/spa. The pool/spa water can be provided to the second pool port 32 by a pump, for example.

FIGS. 2C-2D are sectional views of the vertical sliding backwash valve 4 showing the interior of the vertical sliding backwash valve 4. As shown in FIGS. 2C-2D, the spool 22 is connected with the stem 20, which extends through the end cap 14 and is connected with the handle 18. The spool 22 includes a first piston 40 and a second piston 42 connected by a tie-bar 44. The first and second pistons 40, 42 each include an o-ring sealing gasket 46 for creating a seal radially outward against the body 12. The backwash valve central tube 28 defines a general housing chamber 48 for the spool 22. The general housing chamber 48 can be divided into a plurality of sections. Namely, the general housing chamber 48 includes a first end section 50, a first central section 52, a second central section 54, a third central section 56, and a second end section 58. The first end section 50 spans the first pool port 30 and extends to the end cap 14. The first center section 52 spans the first filter port 34. The second center section 54 spans the second pool port 32. The third center section 56 spans the second filter port 36. The second end section 58 extends from the bottom of the second filter port 36 to the waste outlet 16.

FIGS. 2C-2D illustrate the vertical sliding backwash valve 4 in a configuration for connection with a typical DE filter port configuration. That is, the vertical sliding backwash valve 4 is configured for attachment with a filter body that has a filter inlet port below a filter outlet port. The vertical sliding backwash valve 4 of FIGS. 2C-2D could be configured for attachment with a filter that has a filter inlet port above a filter outlet port, which can be, for example, a sand filter. In such a configuration, the first pool port 30 would function as the waste port, and the waste outlet 16 would return fluid back to the pool/spa.

FIG. 2C is a sectional view of the vertical sliding backwash valve 4 showing the flow-paths when in filter mode. When in filter mode, the handle 18 is pushed down, causing the stem 20 to drive the spool 22 further into the central tube 28. The handle 18 can include a twist lock mechanism that secures the handle 18 in the filter mode position, e.g., pushed down. When the handle 18 is pushed all the way down and two flow paths are created. The first flow path A extends from the first filter port 34, across the first central section 52 and the first end section 50, and to the first pool port 30. The second flow path B extends from the second pool port 32, across the second central section 54 and the third central section 56, and to the second filter port 36.

When in filter mode, pool/spa water is provided to the vertical sliding backwash valve 4 at the second pool port 32 by the pool or spa's water circulation system and flows along arrow B to the second filter port 36. The water exits the vertical sliding backwash valve 4 at the second filter port 36, where it enters a filter. The water traverses the filter, where it is filtered, and is returned to the vertical sliding backwash valve 4 at the first filter port 34 and flows along arrow A to the first pool port 30. The water exits the vertical sliding backwash valve 4 at the first pool port 30, where it is recirculated to the pool/spa. As such, when in filter mode, the pool/spa water travels in two S-like flow paths, e.g., arrows A and B. In this configuration, the spool 22 is retained in the filter mode position by the locking mechanism of the handle, and the friction of the piston seals, e.g., the o-ring gaskets 46. The S-like flow path of the water results in hydraulic inefficiencies, e.g., there is a resistance to water flow and a greater than desired pressure-drop. Further, when the o-ring gaskets 46 begin to wear from the friction created every time the pistons 40, 42 are moved by the handle 18, water may be lost through the radial seal of the second piston 42 where it can leak out from the waste outlet 16.

FIG. 2D is a sectional view of the vertical sliding backwash valve 4 showing the flow-paths when in backwash mode. When in backwash mode, the handle 18 is pulled up, causing the stem 20 to pull the spool 22 towards the first end 24 in the central tube 28. The handle 18 can include a twist lock mechanism that secures the handle 18 in the backwash mode position, e.g., pulled up. When the handle 18 is pulled all the way up two flow paths are created. The first flow path C extends from the second pool port 32, across the second central section 54 and the first central section 52, and to the first filter port 34 for backwashing the filter. The second flow path D extends from the second filter port 36, across the third central section 56 and the second end section 58, and to the waste outlet 16.

When in backwash mode, pool/spa water is provided to the vertical sliding backwash valve 4 at the second pool port 32 by the pool or spa's water circulation system and flows along arrow C to the first filter port 34. The water exits the vertical sliding backwash valve 4 at the first filter port 34, where it enters a filter. The water traverses the filter in a reverse manner to the filter mode, thus backwashing (removing) waste from the filter. This waste water is then returned to the vertical sliding backwash valve 4 at the second filter port 36 and flows along arrow D to the waste outlet 16. The water exits the vertical sliding backwash valve 4 at the waste outlet 16, where it is removed from the pool/spa system. As such, when in backwash mode, the pool/spa water travels in two curved flow paths, e.g., arrows C and D. In this configuration, the water pressure, due to the flow direction and pattern, retains the spool 22 in the backwash mode position.

The above-described prior art thus has S-shaped flow paths both in filter mode and backwash mode. Moreover, the radial seal of the pistons 40, 42 can wear over time.

The present disclosure overcomes one or more of these and/or other drawbacks and/or disadvantages of the prior art.

SUMMARY

The present disclosure relates to a vertical slide backwash valve for reversing fluid flow through a filter body that provides straight-through flow when in a filter mode and enhanced sealing means. The backwash valve includes a body, a sliding gate, a first end cap, a second end cap, a stem, and a handle. The body includes a central tube having first and second ends, first and second pool ports, first and second filter ports, a discharge port, and a discharge port shoulder that is internal to the body. The sliding gate is positionable within the central tube, and includes a shelf gate gasket, and a plurality of chambers that allow fluid to flow through the sliding gate. The first and second end caps are securable to the first and second ends of the body to retain the sliding gate within the body. Additionally, the first end cap includes a hollow boss allowing the stem to extend therethrough and engage a first end of the sliding gate. The stem is connectable to the handle such that the handle can linearly reciprocate the stem and the sliding gate within the body between a plurality of positions. The handle can be locked in a first position wherein the shelf gate gasket compressingly engages the discharge port shoulder thus sealing the discharge port, and the sliding gate provides coaxial straight-through flow between the first filter port and the first pool port, and coaxial straight-through flow between the second pool port and the second filter port. The handle can be locked in a second position where the sliding gate provides curved flow between the second pool port and the first filter port, and curved flow between the second filter port and the discharge port. The first end cap, the stem, and the handle can be interchangeably swapped with the second end cap, so that the stem can engage a second end of the sliding gate.

In some aspects, the sliding gate can include scalloped flanges having removed arcuate portions. The flanges can be positioned, and linearly reciprocate, within channels of the valve body.

BRIEF DESCRIPTION OF THE DRAWINGS

The foregoing features of the invention will be apparent from the following Detailed Description, taken in connection with the accompanying drawings, in which:

FIG. 1A is a perspective view of a diatomaceous earth filter with a vertical slide backwash valve of the prior art;

FIG. 1B is a perspective view of a sand filter with a top-mounted multiport backwash valve of the prior art;

FIG. 1C is a perspective view of a sand filter with a side-mounted multiport backwash valve of the prior art;

DETAILED DESCRIPTION

Embodiments of the present invention relates to a vertical slide backwash valve for reversing fluid flow through a filter body that provides straight-through flow when in a filter mode, as discussed in detail below in connection with FIGS. 3-16.

Figure 14:
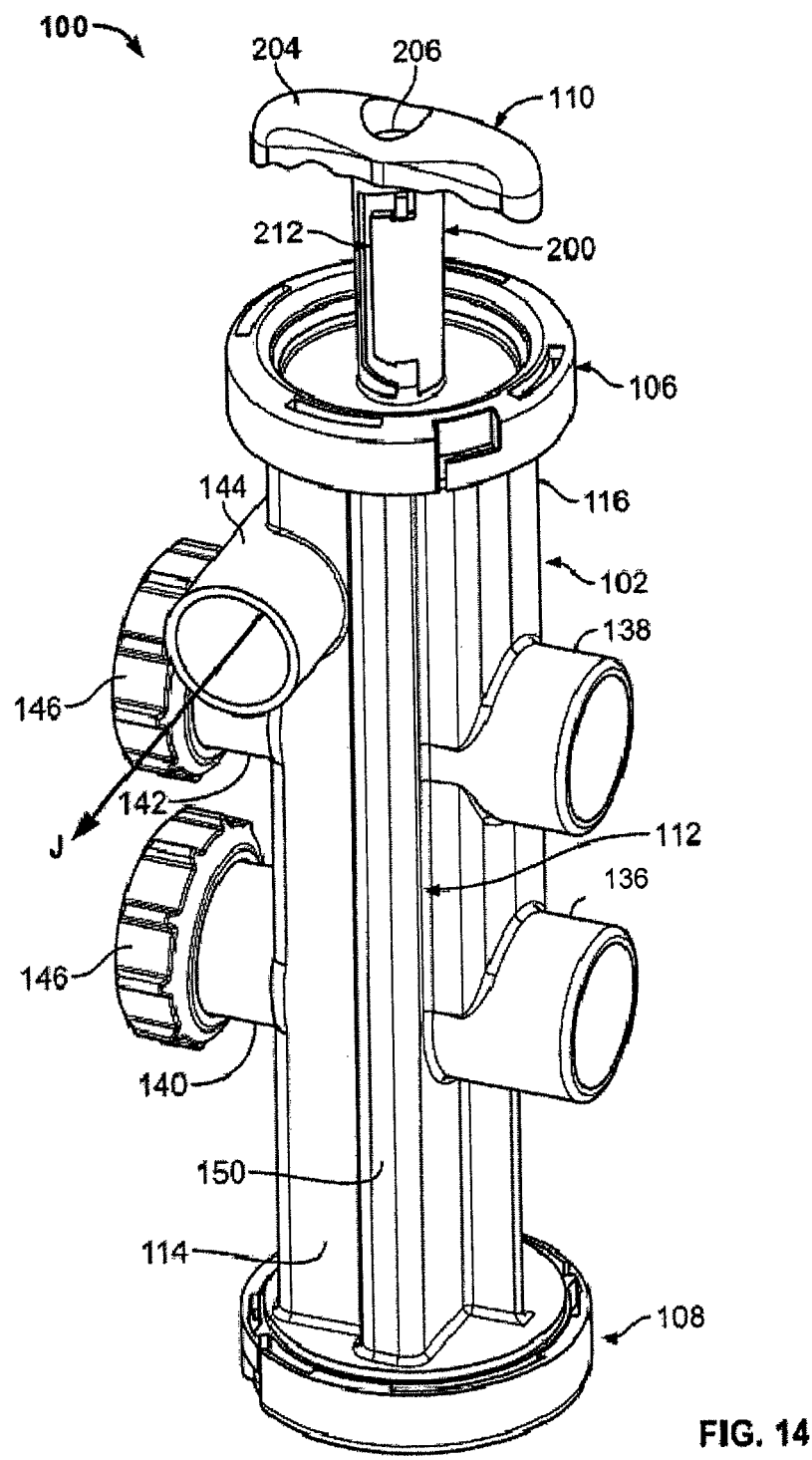
FIG. 14 is perspective view of the vertical slide valve of the present disclosure in a second configuration that is "reversible" with respect to the first configuration of FIGS. 3-13.
Figure 15:
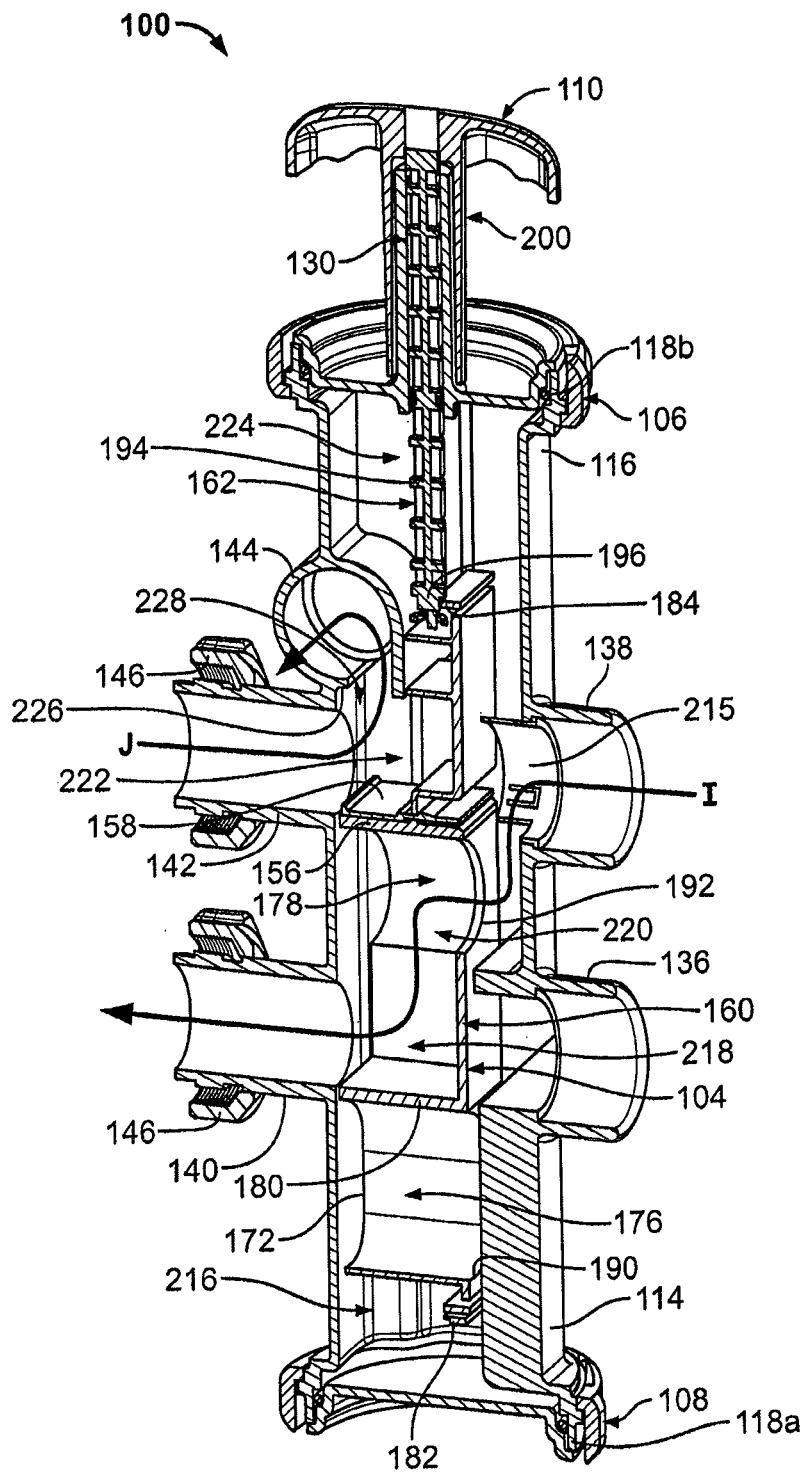
FIG. 15 is a sectional view of the vertical valve of FIG. 14 showing the slide valve in a backwash mode.
Figure 16:
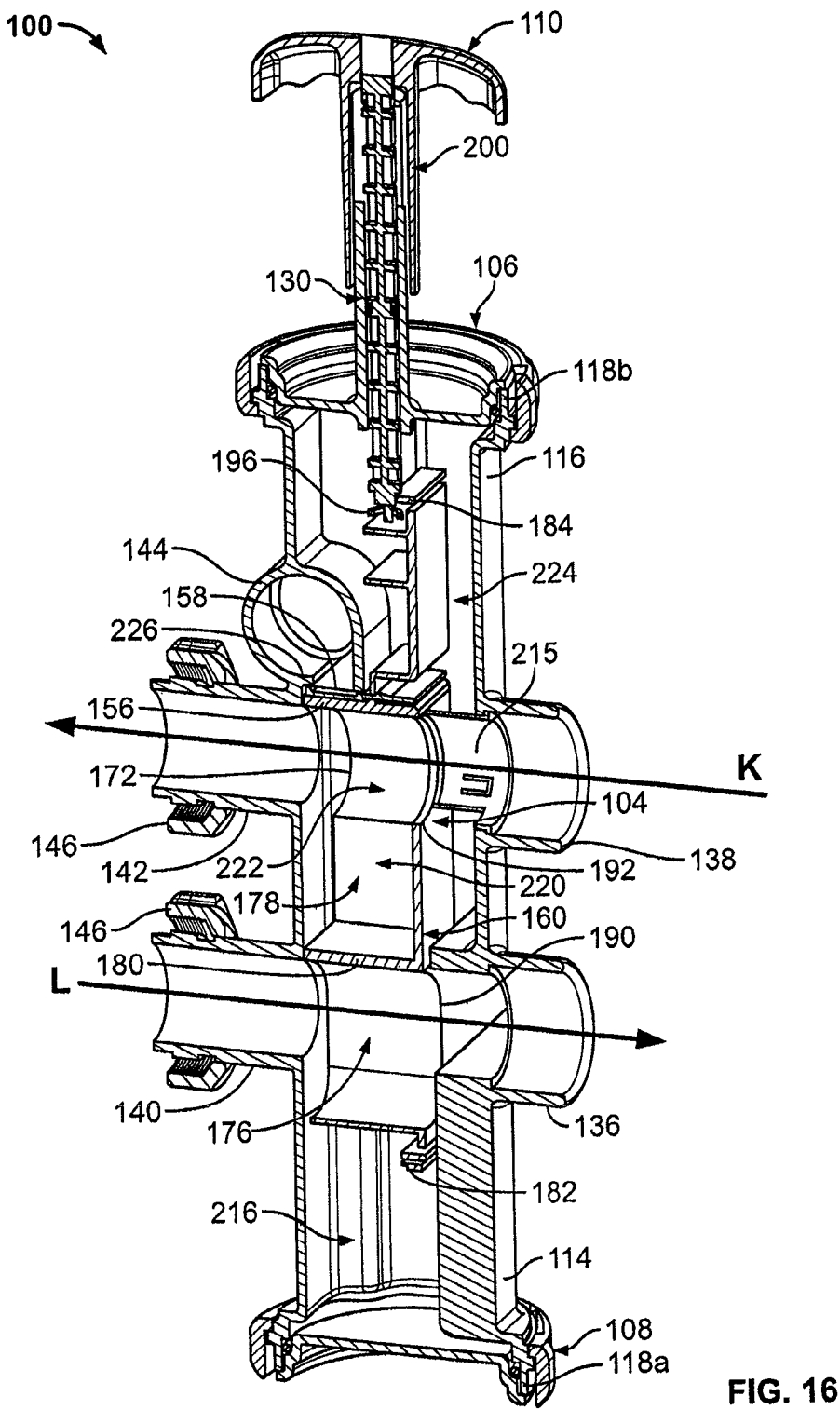
FIG. 16 is a sectional view of the vertical valve of FIG. 14 showing the slide valve in a filter mode.

With reference to FIGS. 3-16, a reconfigurable vertical slide backwash valve 100 is shown in accordance with the present disclosure. FIGS. 3-13 show the reconfigurable vertical slide backwash valve 100 in a first configuration, while FIGS. 14-16 show the reconfigurable vertical slide backwash valve 100 in a second configuration. The vertical slide backwash valve 100 generally includes a body 102, a sliding gate 104 (see FIG. 6), a first end cap 106, a second end cap 108, and a handle 110. The body 102 includes a central tube 112 (which can be a square tube, circular tube, etc.) having a first end 114 and a second end 116. The first and second ends 114, 116 include a respective first and second locking ring 118a, 118b. The first and second locking rings 118a, 118b each include a plurality of locking protrusions 120 on the exterior of the locking ring 118a, 118b, and a shoulder 121 (see FIG. 9) on the interior of the locking ring 118a, 118b. The shoulders 121 provide a seating surface for an o-ring 122 that is compressed between an interior cylindrical surface of the respective locking ring 118a, 118b and the respective first and second end cap 106, 108 when the first and second caps 106, 108 are secured to the first and second locking rings 118a, 118b.

The first end cap 106 includes a central portion 123, a stepped wall 124, an exterior wall 126, a plurality of locking protuberances 128, and a hollow boss 130. The stepped wall 124 and the exterior wall 126 define an annular chamber 132. The plurality of locking protuberances 128 extend from the exterior wall 126 into the annular chamber 132 and are designed to engage and lock with the locking protrusions 120 on the first and second locking rings 118a, 118b. The first end cap 106 can be placed over the first or second locking ring 118a, 118b such that the respective locking ring 118a, 118 is within the annular chamber 132 and the o-ring 122 is compressed between the stepped wall 124 and an interior cylindrical surface of the respective locking ring 118a, 118b, creating a fluid tight radial seal. The first end cap 106 can then be rotated to lock the locking protuberances 128 with the locking protrusions 120. The hollow boss 130 extends from the central portion 123 and includes a follower 134 that extends radially from the boss 130. The follower 134 will be discussed in greater detail below.

The second end cap 108 has a similar construction to the first end cap 106, except that the second end cap 108 does not have the hollow boss 130 that is present on the first end cap 106. Instead, the second end cap 108 has an uninterrupted central portion 123. In describing the second end cap 108, reference is made to the first end cap 106 and like reference numerals are provided for like components; thus, the structure and function of the second end cap 108 need not be explained in further detail, instead the description provided for the first end cap 106 can be referenced. Alternatively, the first and second end caps 106, 108 can include alternative means for attachment to the first or second locking rings 118a, 118b, such as, threading, quarter-turn locks, snap-fit mating, etc.

The body 102 further includes a first pool port 136, a second pool port 138, a first filter port 140, a second filter port 142, and a waste port 144, which extend from the central tube 112. The first pool port 136 and the first filter port 140 are positioned on opposite sides of the central tube 112 and are coaxial with one another. The second pool port 138 and the second filter port 142 are positioned on opposite sides of the central tube 112 and are coaxial with one another. Accordingly, the first and second pool ports 136, 138 are on the same side of the body 102, and the first and second filter ports 140, 142 are on the same side of the body 102. The waste port 144 is generally positioned on the central tube 112 between the second filter port 142 and the second locking ring 118b. The waste port 144 is generally positioned perpendicular to the second filter port 142 so it is not blocked by a filter when the vertical slide backwash valve 100 is connected to the filter. However, it should be understood by one of ordinary skill in the art that the waste port 144 can be positioned at any angle relative to the second filter port 142 as long as it can avoid an associated filter. Additionally, it shall be understood by one of ordinary skill in the art that the valve body 102, first and second pool ports 136, 138, first and second filter ports 140, 142, and waste port 144 could be sized, shaped, and spaced to suit different filters, and can be oriented in arrangements other than a vertical arrangement to suit a filter body having inlet and outlet ports that are not vertically aligned. The first and second filter ports 140, 142 can each include a nut 146 that is engageable with a port of a filter to secure the first and second filter ports 140, 142 to the filter. Further, a nut retaining ring 148 may be provided for each of the nuts 146 to facilitate securing the first and second filter ports 140, 142 with the ports of the filter. The first and second pool ports 136, 138 are connectable with the fluid circulation system of a pool/spa. Specifically, the second pool port 138 can receive fluid from the pool/spa while the first pool port 136 can return fluid back to the pool/spa. The pool/spa water can be provided to the second pool port 138 by a pump, for example.

The central tube 112 includes a first channel 150 and a second channel 152 extending outwardly from the central tube 112. The first and second channels 150, 152 are positioned on opposite sides of the central tube 112, across from one another, and adjacent the side of the central tube 112 that includes the first and second pool ports 136, 138. For example, the central tube 112, the first channel 150, and the second channel 152 can form a "T-shaped" geometry. The first and second channels 150, 152 are discussed in greater detail below.

The sliding gate 104 includes a gate body 154, a shelf gate 156, a gasket 158, a faceplate 160, and a stem 162. The gate body 154 includes first and second side walls 164, 166, first and second rounded top and bottom walls 168, 170, an open front 172, and a rear 174. The gate body 154 defines a first chamber 176 and a second chamber 178 separated by an internal wall 180. The shelf gate 156 is connected to the bottom wall 170 and provides a surface for the gasket 158 to be mounted to. The faceplate 160 is mounted to the rear 174 of the gate body 154. In some embodiments, the faceplate 160 can actually be the rear 174 of the gate body 154, and thus integral with the gate body 154. The faceplate 160 is generally rectangular in nature, and has a width that is greater than the width of the gate body 154. That is, the faceplate 160 extends beyond the gate body 154 to create a "T-shape." The T-shape created between the faceplate 160 and the gate body 154 generally matches the T-shaped geometry formed between the central tube 112, the first channel 150, and the second channel 152. The faceplate 160 includes a first stem mount 182, a second stem mount 184, a first flange 186, a second flange 188, a first flow opening 190, and a second flow opening 192. The first stem mount 182 is located at one end of the faceplate 160, while the second stem mount 184 is located at an opposite end of the faceplate 160. The first and second flanges 186, 188 are located on opposite lateral sides of the faceplate 160, and extend the height of the faceplate 160. The first and second flanges 186, 188 have a sinusoidal or scalloped design that includes a plurality of removed sections. The purpose of this design is discussed in greater detail below. The first flow opening 190 extends through the faceplate 160 adjacent the first chamber 176, such that fluid can flow in to and out from the first chamber 176 through the first flow opening 190. The second flow opening 192 extends through the faceplate 160 adjacent the second chamber 178, such that fluid can flow in to and out from the second chamber 178 through the second flow opening 192. The sliding gate 104 is shaped and configured to be positioned and translate within the body 102, such that the gate body 154 is positioned within the central tube 112, the open front 172 is positioned adjacent the first and second filter ports 140, 142, the faceplate 160 is positioned adjacent the first and second pool ports 136, 138, the first flange 186 is positioned within the first channel 150, and the second flange 188 is positioned within the second channel 152. When the handle 110 is in an unlocked position, such an arrangement allows the sliding gate 104 to slide along, and reciprocate linearly within, the length of the body 102, e.g., from the first end 114 in the direction of the second end 116 and from the second end 116 in the direction of the first end 114.

The stem 162 includes a body 194 that extends between a sliding gate connector 196 and a handle connector 198. The sliding gate connector 196 is configured to removably attach to the first and second stem mounts 182, 184, depending on a desired configuration (e.g., the first configuration of FIGS. 3-13 versus the second configuration of FIGS. 14-16). For example, the sliding gate connector 196 can be a dovetail, while the first and second stem mounts 182, 184 can be dovetail sockets of the sliding gate connector 196. The handle connector 198 allows the stem 162 to be removably attached with the handle 110. For example, the handle connector 198 can include a snap-fit mechanism including two flexible arms that engage a shoulder of the handle 110. The flexible arms can be pressed together to remove the handle 110 from the stem 162. The stem 162 is configured to be inserted into, and extend through, the hollow boss 130 of the first end cap 106.

Figure 7:
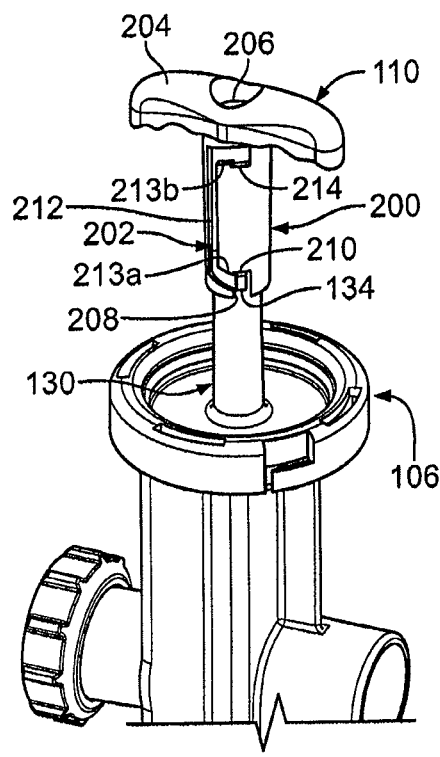
FIG. 7 is a rear perspective view of the vertical slide valve of FIG. 3 showing the handle secured in a backwash mode.
Figure 8:
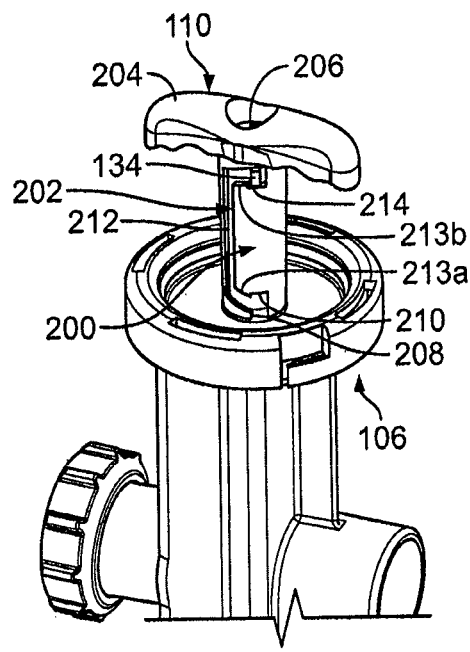
FIG. 8 is a rear perspective view of the vertical slide valve of FIG. 3 showing the handle secured in a filter mode.

FIGS. 7-8 are perspective views of the handle 110. Specifically, FIG. 7 shows the handle 110 in a backwash position, while FIG. 8 shows the handle 110 in a filter position. The handle 110 includes a hollow shaft 200 including a track 202, and a handlebar 204. A central hollow core extends through the hollow shaft 200 and the handlebar 204, which includes an aperture 206. The hollow shaft 200 is configured to be placed over the hollow boss 130, while the aperture 206 is provided to allow access to the handle connector 198 of the stem 162 when the handle connector 198 is engaged with the handle 110. Accordingly, the handle connector 198 can be disengaged from the handle 110 through the aperture 206. The track 202 is provided through a wall of the hollow shaft 200 and includes an entrance 208, a first locking well 210, a main track 212, and a second locking well 214. The main track 212 extends between the first and second locking wells 210, 214, and can include first and second ramps 213a, 213b respectively leading to the first and second locking wells 210, 214. The first ramp 213a is generally downwardly sloped toward the first locking well 210, while the second ramp 213b is generally upwardly sloped toward the second locking well 214.

Figure 9:
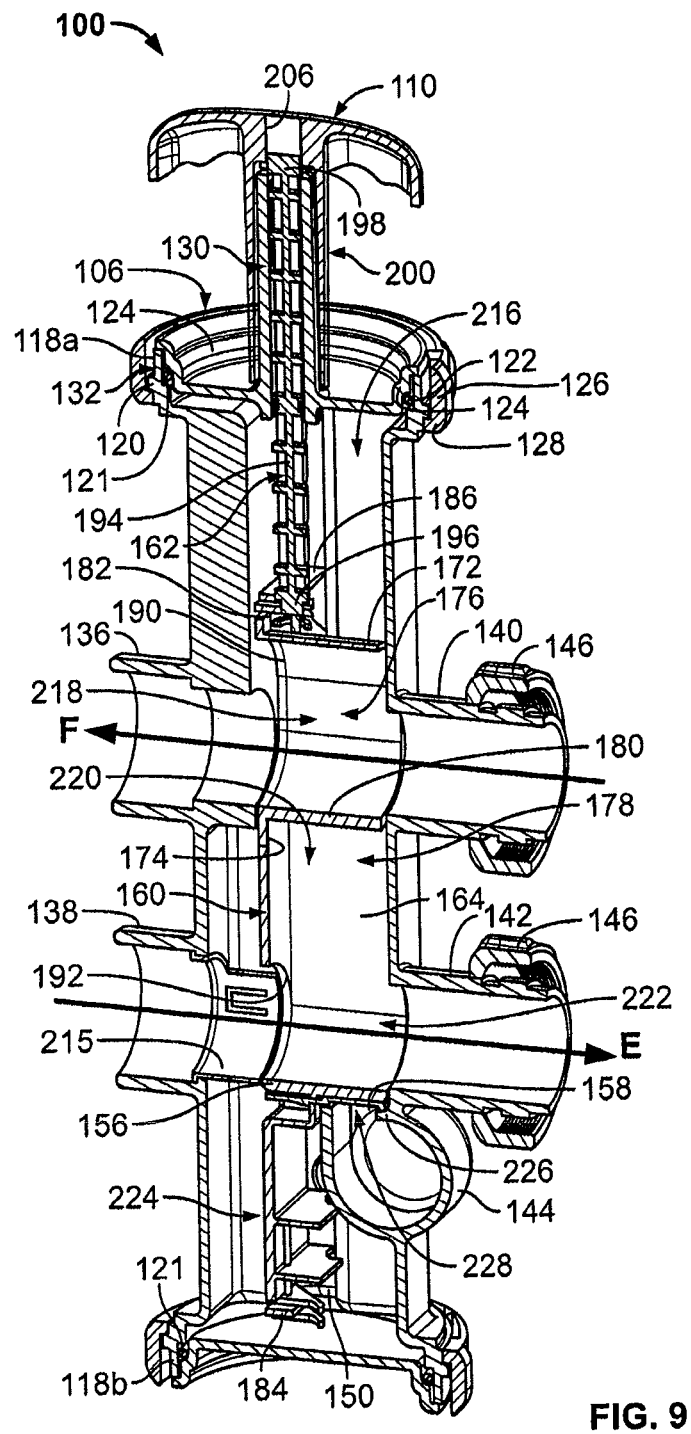
FIG. 9 is a sectional view of the vertical slide valve of FIG. 3 taken along section line 9-9 of FIG. 5 and showing the slide valve in a filter mode.
Figure 10:
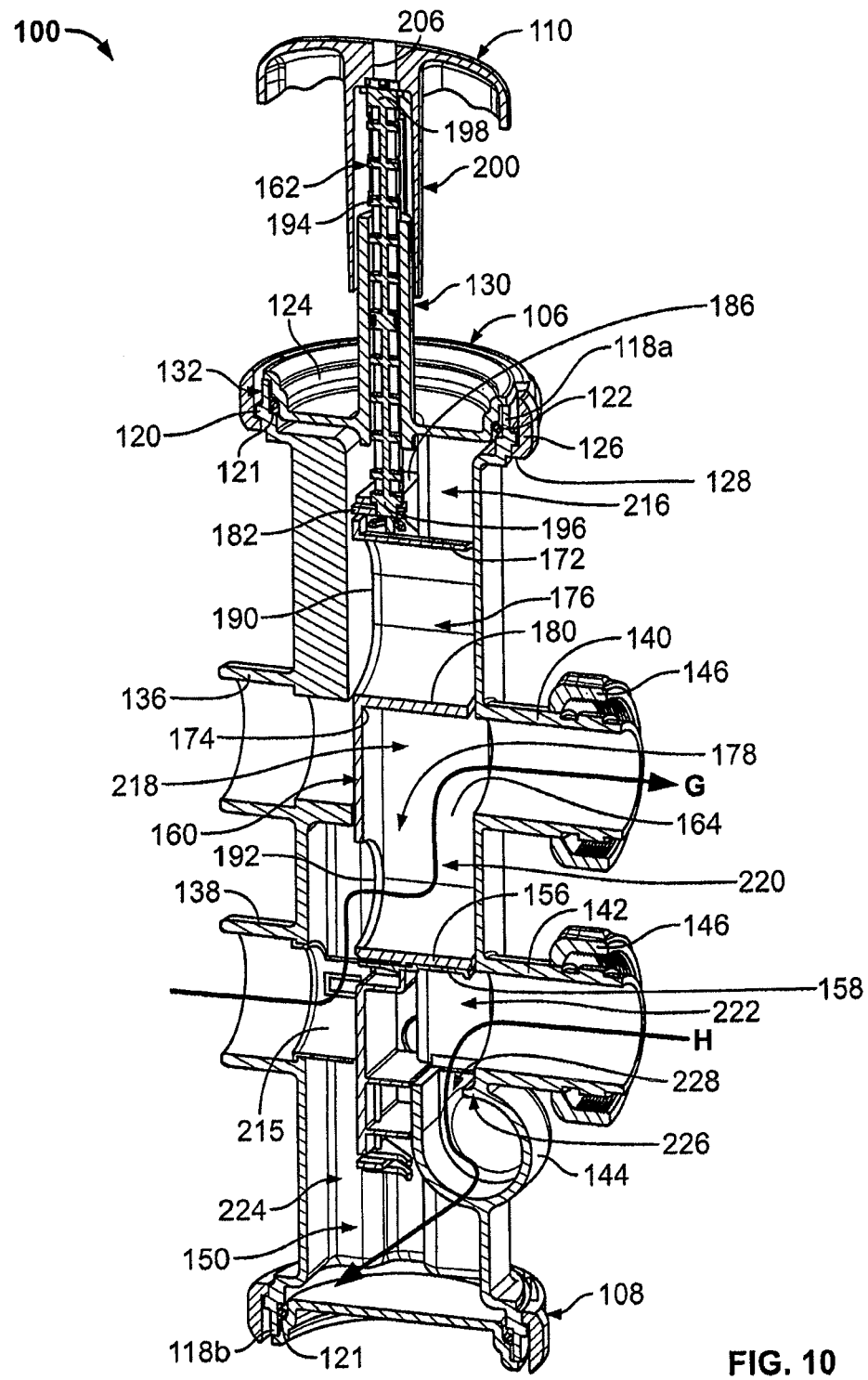
FIG. 10 is a sectional view of the vertical slide valve of FIG. 3 taken along section line 10-10 of FIG. 5 and showing the slide valve in a backwash mode.

The handle 110 can be placed over the boss 130 of the first end cap 106 so that the boss 130 is inserted into the hollow shaft 200 and the follower 134 of the boss 130 is inserted into the track entrance 208. The handle 110 can be moved to secure the follower 134 in either the first or second locking wells 212, 214. That is, the handle 110 can be placed into a first position, where the follower 134 is secured within the first locking well 210 and the handle 110 is inhibited from being pushed down any further, as shown in FIGS. 7 and 10. To move the handle 110 so that the follower 134 is in the second locking well 214, the handle 110 is pulled slightly upward and rotated so that the follower 134 exits the first locking well 210 and begins to traverse the main track 212. When the follower 134 is in the main track 212, the handle 110 is pushed down, so that the hollow shaft 200 covers more of the boss 130 and the follower 134 traverses the main track 212. The handle 110 is then rotated to place the follower 134 in the second locking well 214, as shown in FIGS. 8-9. The second ramp 213b facilitates rotation of the handle 110 and placement of the follower 134 in the second locking well 214 by providing a mechanical advantage during rotation to create the proper compression of the gasket 158. To move the handle 110 back so that the follower 134 is in the first locking well 210, the handle 110 is pushed slightly downward and rotated so that the follower 134 exits the second locking well 214 and begins to traverse the main track 212. When the follower 134 is in the main track 212, the handle 110 is pulled up, so that the hollow shaft 200 covers less of the boss 130 and the follower 134 traverses the main track 212. The handle 110 is then rotated to place the follower 134 in the first locking well 210, as shown in FIGS. 7 and 10. The first ramp 213a facilitates rotation of the handle 110 and placement of the follower 134 in the first locking well 210 by providing a mechanical advantage during rotation. The movement and configuration of the handle 110, track 212, and follower 134 can be characterized as a bayonet mount. Further, when the sliding gate 104 is connected to the handle 110, e.g., by the stem 162, the track 202 and follower 134 arrangement allows the handle to reciprocate the sliding gate 104 between different positions, and lock the sliding gate 104 in two different positions. The first and second locking wells 210, 214 prevent accidental slip back down the first and second ramp 213a, 213b. One of ordinary skill in the art shall understand that the handle 110 can include additional and/or alternative mechanisms for locking in the backwash or filter position, e.g., a spring-loaded snap. Alternatively, a horizontal track could replace the first and second locking wells 210, 214, such that the follower 134 could be retained in the horizontal track, thus holding the sliding gate 104 it position.

Accordingly, the handle 110 can be locked in a plurality of positions. The first position, e.g., when the follower 134 is locked in the second locking well 214 as shown in FIG. 8, places the vertical slide backwash valve 100 in filter mode. The second position, e.g., when the follower 134 is locked in the first locking well 210 as shown in FIG. 7, places the vertical slide backwash valve 100 in backwash mode.

To construct the vertical slide backwash valve 100, an o-ring 122 is positioned in the second locking ring 118b, and the second end cap 108 is positioned over the second locking ring 118b. The second end cap 108 is rotated so that the locking protuberances 128 engage and lock with the locking protrusions 120 of the second locking ring 118b, securing the second end cap 108 with the second locking ring 118b. The stem 162 is connected with the sliding gate 104, such that the sliding gate connector 196 engages the first stem mount 182. The first end cap 106 is positioned over the stem 162 so that the stem 162 extends through the hollow boss 130, and the handle connector 198 is exposed. The handle 110 is positioned over the exposed stem 162 and pushed toward the first end cap 106 until the handle connector 198 engages the handle 110. The handle 110 is positioned over the hollow boss 130 so that the hollow boss 130 is inserted into the hollow shaft 200 and the follower 134 is inserted into the track entrance 208. A second o-ring 122 is positioned in the first locking ring 118a, and the sliding gate 104 is inserted into the valve body 102, such that the first flange 186 is inserted into the first channel 150, the second flange 188 is inserted into the second channel 152, and the gate body 154 is inserted into the central tube 112.

The sliding gate 104 is inserted into the valve body 102 and the first end cap 106 is placed over the first locking ring 118a. The first end cap 106 is rotated so that the locking protuberances 128 engage and lock with the locking protrusions 120, securing the first end cap 106 with the first locking ring 118a. A flow collar 215 can be inserted into the second pool port 138 to essentially extend the second pool port 138 to the second flow opening 192 of the sliding gate 104. The flow collar 215 can include an annular lip that engages an internal shoulder of the second pool port 138, securing the flow collar 215 in place. When the vertical slide backwash valve 100 is fully constructed the sliding gate 104 can be reciprocated within the valve body 102 by movement of the handle 110 as previously discussed in relation to FIG. 7.

Vertical slide backwash valve 100 can then be connected to a filter and pool circulation system. Particularly, the first and second pool ports 136, 138 can be connected to a pool/spa circulation system, while the first and second filter ports 140, 142 can be connected to a filter inlet and outlet. The second pool port 138 can be connected to the pool/spa circulation system outlet so that the pool/spa circulation system provides the second pool port 138 with water to be filtered. The second filter port 142 can be connected to the filter inlet so that it provides the filter with water to be filtered. The second filter port 142 can be secured to the filter inlet by the nut 146. The nut 146 is secured to the second filter port 142 by the nut retaining ring 148. The first filter port 140 should be connected to the filter outlet so that it receives filtered water from the filter to return to the pool/spa. The first filter port 140 can be secured to the filter inlet by a nut 146. The nut 146 is secured to the first filter port 140 by the nut retaining ring 148. The first pool port 136 can be connected to the pool/spa circulation system inlet so that the pool/spa circulation system receives filtered water from the first pool port 136. The first and second pool ports 136, 138 and the first and second filter ports 140, 142 can be configured for multiple types of connections for both pool piping and filter inlets and outlets. For example, the first and second pool ports 136, 138 and the first and second filter ports 140, 142 can be configured for attachment by socket weld pipe fittings, union connectors utilizing gaskets or o-rings, etc.

As mentioned previously, the handle 110 can be locked in a plurality of positions. When in the first configuration of FIGS. 3-16, the first position, e.g., when the follower 134 is locked in the second locking well 214 as shown in FIG. 8, places the vertical slide backwash valve 100 in filter mode. The second position, e.g., when the follower 134 is locked in the first locking well 210 as shown in FIG. 7, places the vertical slide backwash valve 100 in backwash mode.

FIGS. 9-16 are sectional views of the vertical slide backwash valve 100 showing the interior of the vertical slide backwash valve 100. As seen in FIGS. 9-13, for example, which show the first configuration of the valve 100, the central tube 112 can be divided into a plurality of sections. Namely, the central tube 112 includes a first end section 216, a first flow section 218, a second flow section 220, a third flow section 222, and a second end section 224. The first end section 216 extends from the top of the first pool port 136 and the first filter port 140 to the first end cap 106. The first flow section 218 spans, and is coaxial with, the first pool port 136 and the first filter port 140. The second flow section 220 extends from the bottom of the first pool port 136 and the first filter port 140 to the top of the second pool port 138 and the second filter port 142. The third flow section 222 spans, and is coaxial with, the second pool port 138 and the second filter port 142. The second end section 224 extends from the bottom of the second pool port 138 and the second filter port 142 to the second end cap 108. The discharge port 144 extends into the second end section 224 and includes a discharge port shoulder 226 that defines a discharge opening 228. The discharge opening 228, when not closed-off by the shelf gate 156 and gasket 158, allows fluid to flow through the central tube 112 and out from the discharge port 144. The discharge port shoulder 226 is positioned parallel to the shelf gate 156 when the sliding gate 104 is positioned within the central tube 112. The gasket 158 for the shelf gate 156 is dimensioned to match the discharge port shoulder 226 such that it seals the discharge port shoulder 226 when it is engaged therewith, which is discussed in greater detail below in connection with a filter mode of operation. The discharge port shoulder 226 is shown in FIGS. 9-12 as being adjacent to the bottom of the second filter port 142. However, one of ordinary skill in the art would understand that in other embodiments, the discharge port 144 could be positioned closer to the second end 116 of the central tube 112, and the discharge port shoulder 226 can follow suit. In such embodiments, the shelf gate 156 of the sliding gate 104, and thus the gasket 158, could be spaced from the sliding gate body 154 according to the discharge port shoulder 226 positioning. Additionally, the gasket 158 could be equipped with a spring to apply a constant force on the gasket 158 enhancing the compression.

Figure 2A:
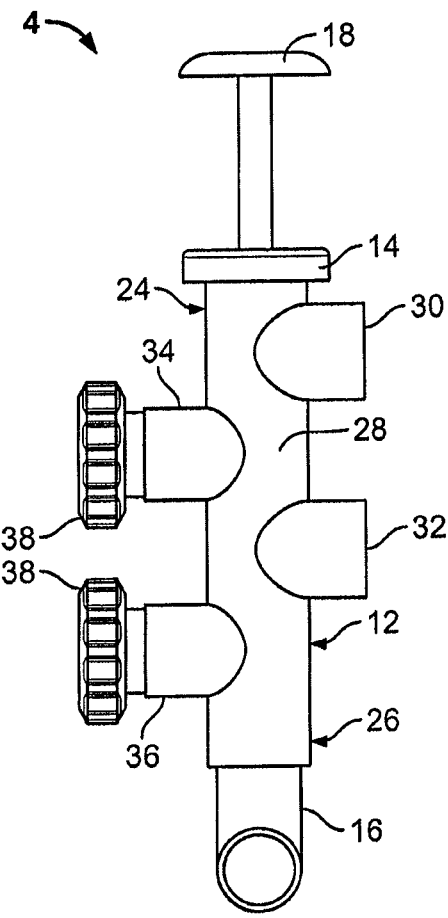
FIG. 2A is a side elevational view of a vertical slide backwash valve of FIG. 1A.
Figure 2B:
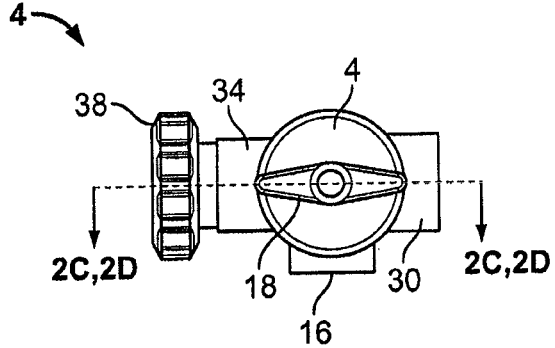
FIG. 2B is a top view of the prior art vertical slide backwash valve of FIG. 2A.
Figure 2C:
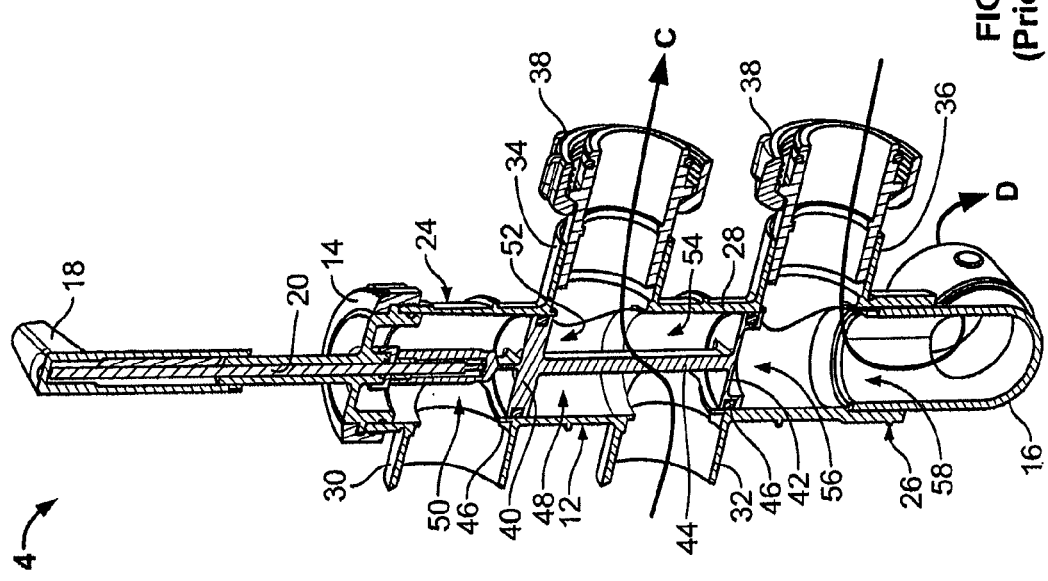
FIG. 2C is a sectional view of the prior art vertical slide backwash valve taken along line 2C-2C of FIG. 2B showing the slide valve in a filter mode.
Figure 2D:
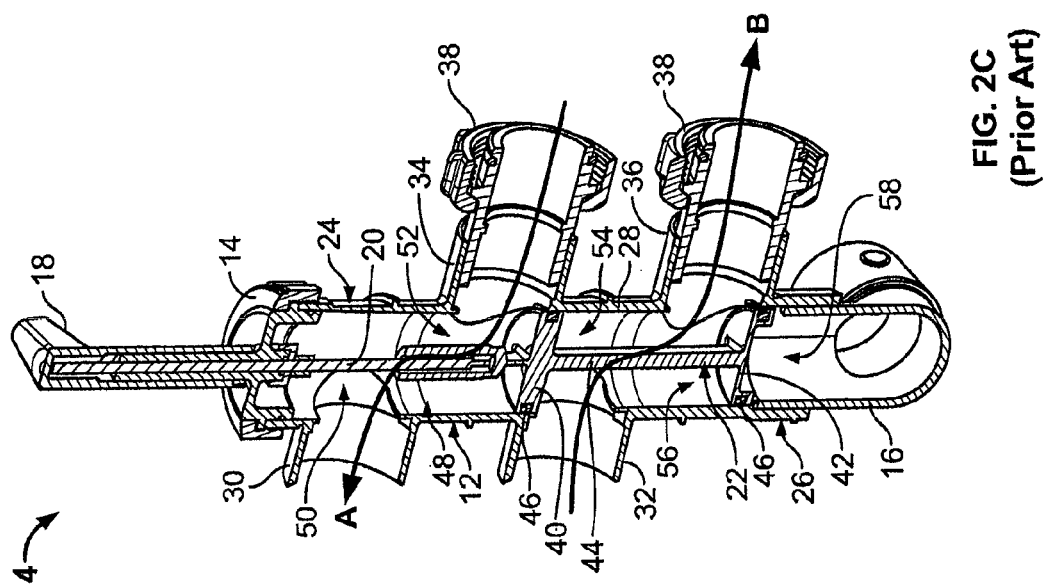
FIG. 2D is a sectional view of the prior art vertical slide backwash valve taken along line 2C-2C of FIG. 2B showing the slide valve in a backwash mode.
Figure 3:
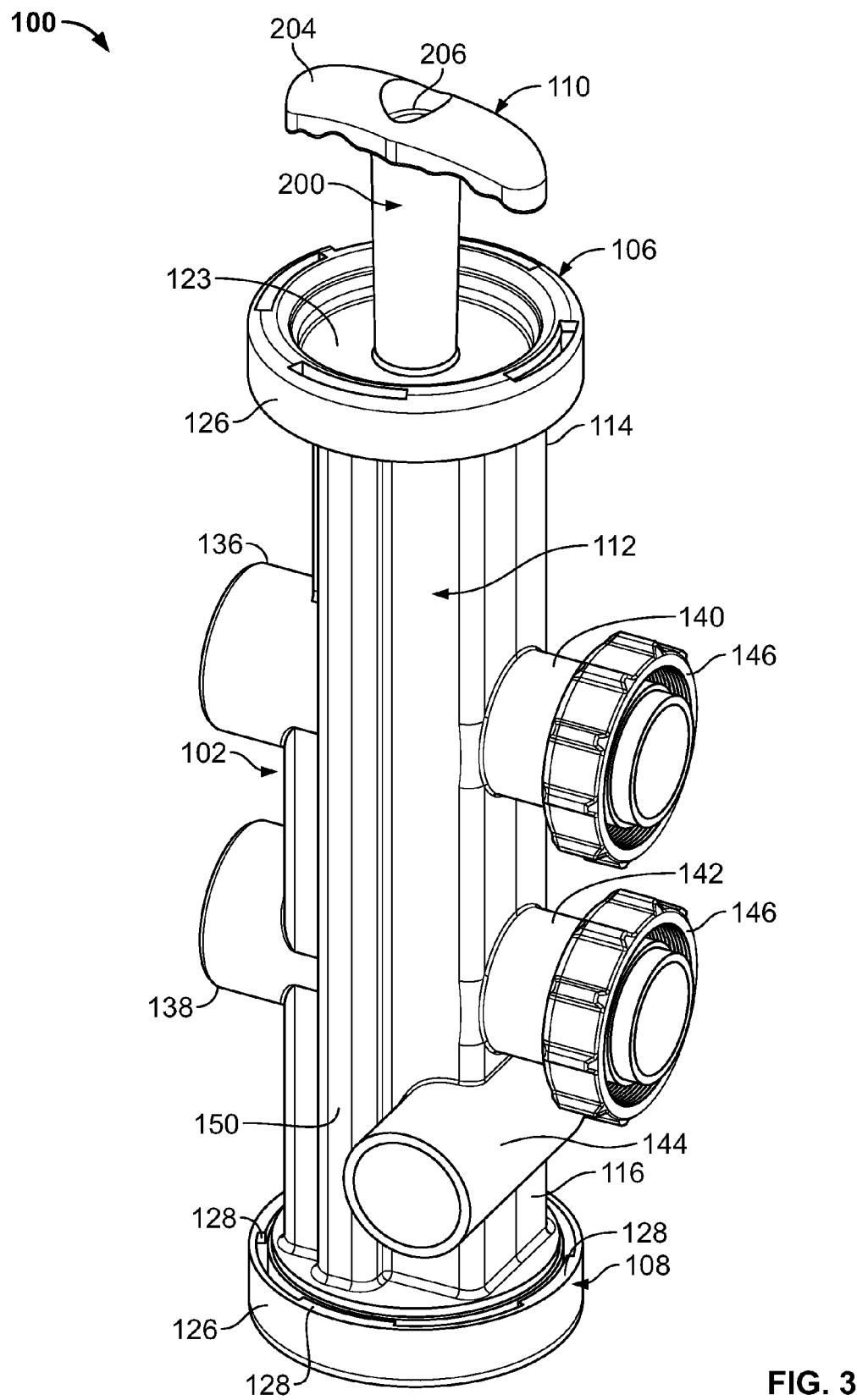
FIG. 3 is a front perspective view of the vertical slide valve of the present disclosure in a first configuration.
Figure 4:
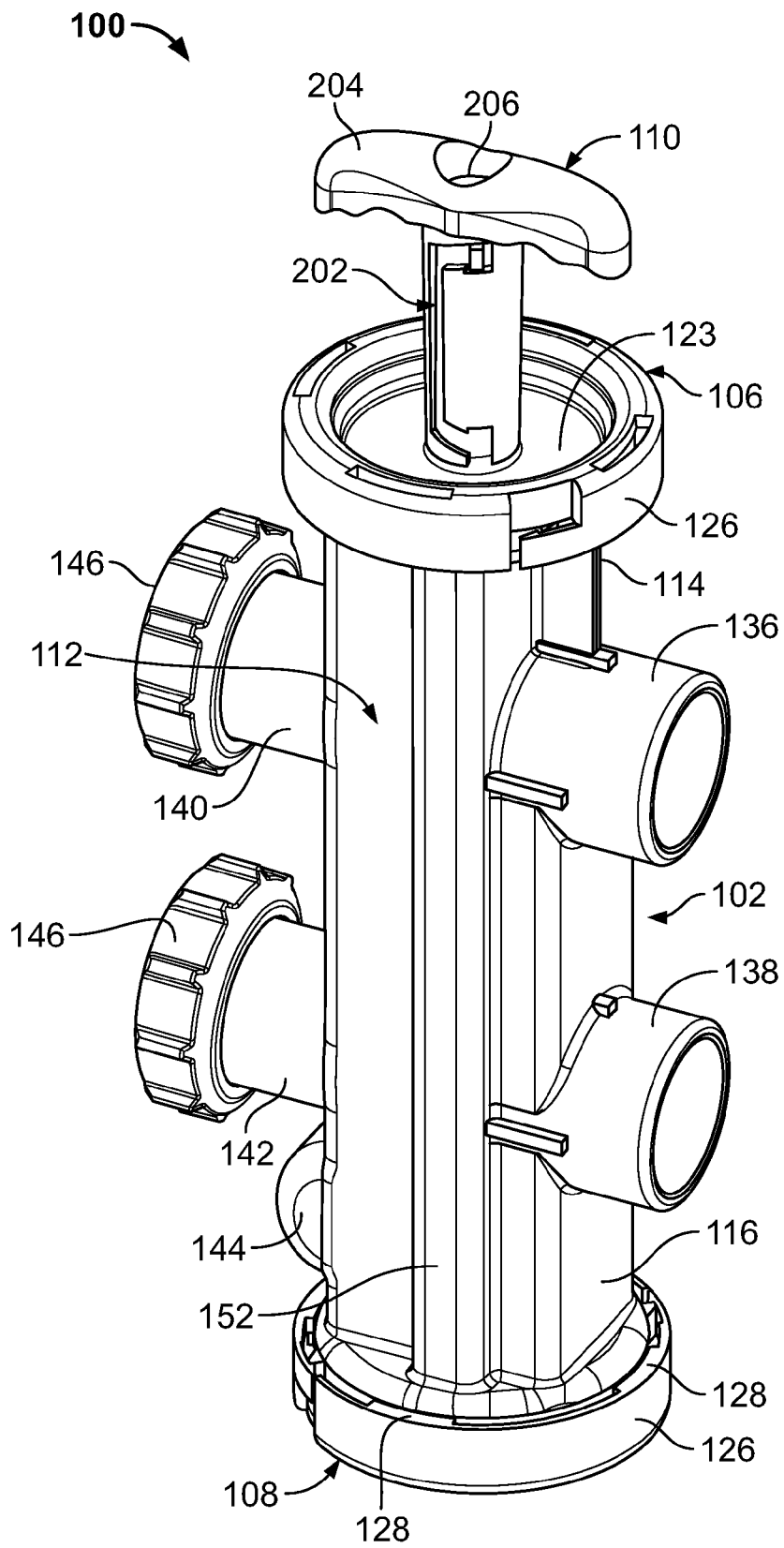
FIG. 4 is a rear perspective view of the vertical slide valve of FIG. 3.
Figure 5:
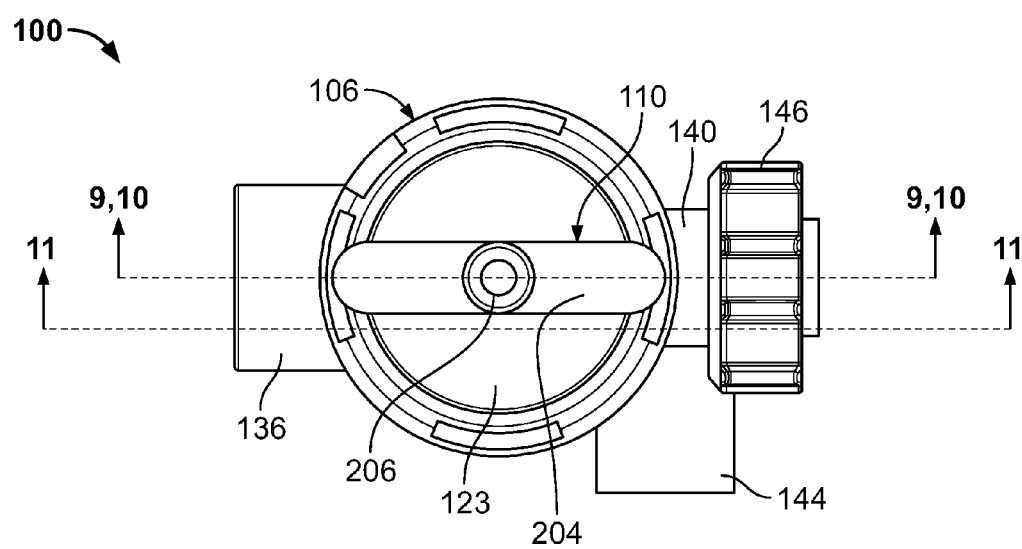
FIG. 5 is a top plan view of the vertical slide valve of FIG. 3.
Figure 6:
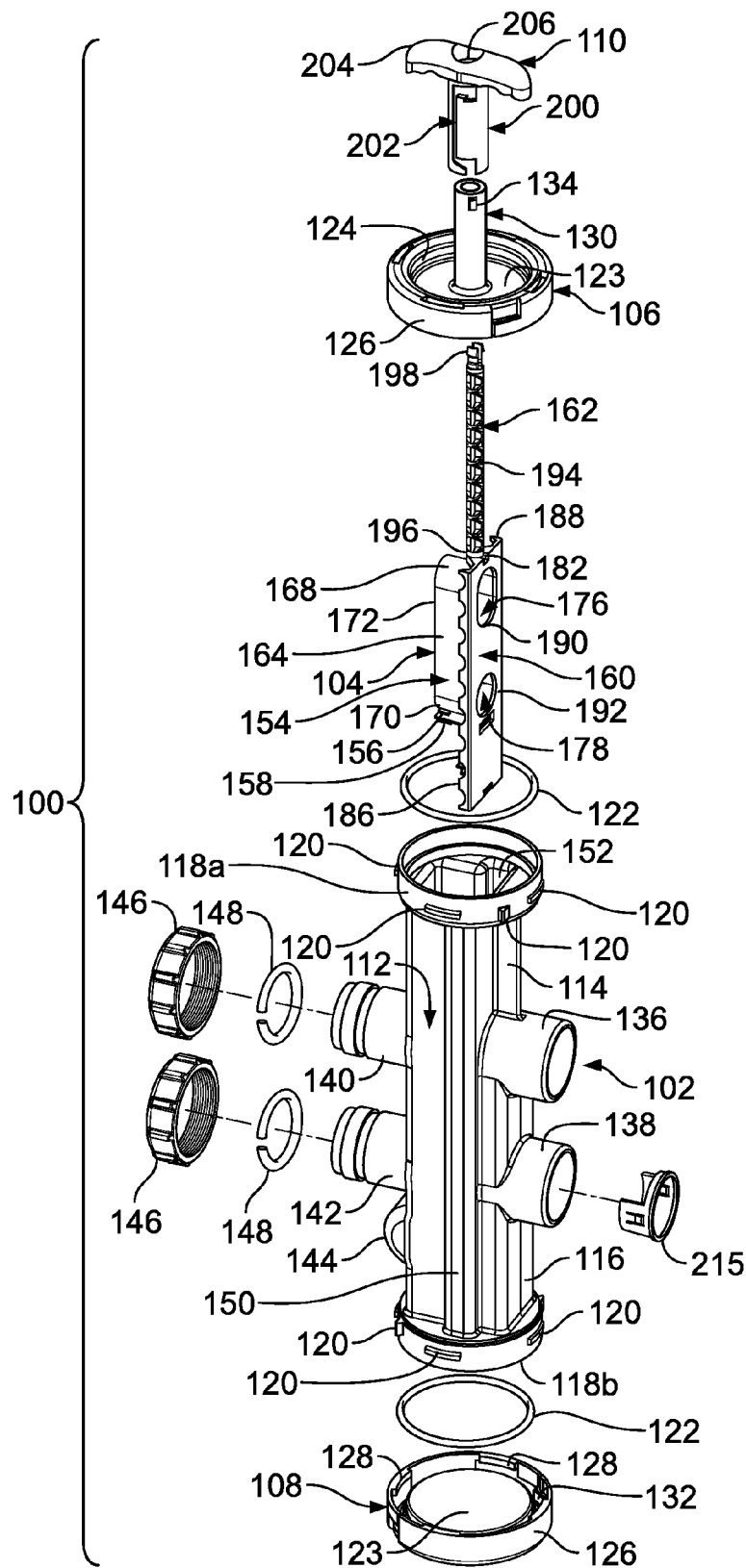
FIG. 6 is a rear exploded perspective view of the vertical slide valve of FIG. 3.

FIG. 9, is a sectional view of the vertical slide backwash valve 100 in filter mode and taken along line 9/10-9/10 of FIG. 5. When the vertical slide backwash valve 100 is in filter mode, the handle is pushed all the way down, causing the stem 162 to drive the sliding gate 104 into the central tube 112, until the gasket 158 compressingly engages the discharge port shoulder 226, and the follower 134 is locked in the second locking well 214. Two straight-through flow paths are created. The first straight-through flow path E extends from the second pool port 138 to the second filter port 142. The second straight-through flow path F extends from the first filter port 140 to the first pool port 136. Each straight-through flow path provides for reduced pressure-drop as compared to an S-path, for example.

When in filter mode, pool/spa water is provided to the vertical sliding backwash valve 100 at the second pool port 138 by the pool or spa's water circulation system, and flows straight-through along arrow E to the second filter port 142. That is, the water flows into the second pool port 138, across the collar 215, in the sliding gate second flow opening 192, to the second chamber 178 of the sliding gate 104 (which is positioned within the third flow section 222), out the sliding gate open front 172, and to the second filter port 142. The water exits the vertical sliding backwash valve 100 at the second filter port 142, where it enters a filter. The water traverses the filter, where it is filtered, and is returned to the vertical sliding backwash valve 100 at the first filter port 140 and flow along arrow F to the first pool port 136. That is, the water flows into the first filter port 140, into the sliding gate open front 172, to the first chamber 176 of the sliding gate 104 (which is positioned within the first flow section 218), out the sliding gate first flow opening 190, and to the first pool port 136. The water exits the vertical sliding backwash valve 100 at the first pool port 136, where it is recirculated to the pool/spa. Water is substantially prevented from flowing between the first and second chambers 176, 178 because of the internal wall 180. Any water that leaks between the first and second chambers 176, 178 is of no consequence as it will have a negligible effect on the performance of the system, and will simply flow back to the pool/spa. When in filter mode, the pool/spa water travels in two line-of-sight, or straight-through, flow paths, e.g., arrows E and F. The straight-through flow paths of arrows E and F provide hydraulic efficiency and minimal pressure drop. Further, water does not leak from the waste outlet 144 due to the compression of the gasket 158 against the discharge port shoulder 226, which seals the discharge opening 228. Therefore, the gasket 158 engages and disengages the discharge port shoulder 226 via a linear movement that is in a direction normal to the discharge port shoulder 226. Accordingly, in contrast to the radial seal of the prior art backwash valve 4, the gasket 158 of the present disclosure is not required to slide across any surfaces. This results in an increased life expectancy of the gasket 158 and minimizes any need for lubricant. The gasket 158 is removably secured to the shelf gate 156 so that it can be replaced if it is ever damaged or worn.

Figure 11:
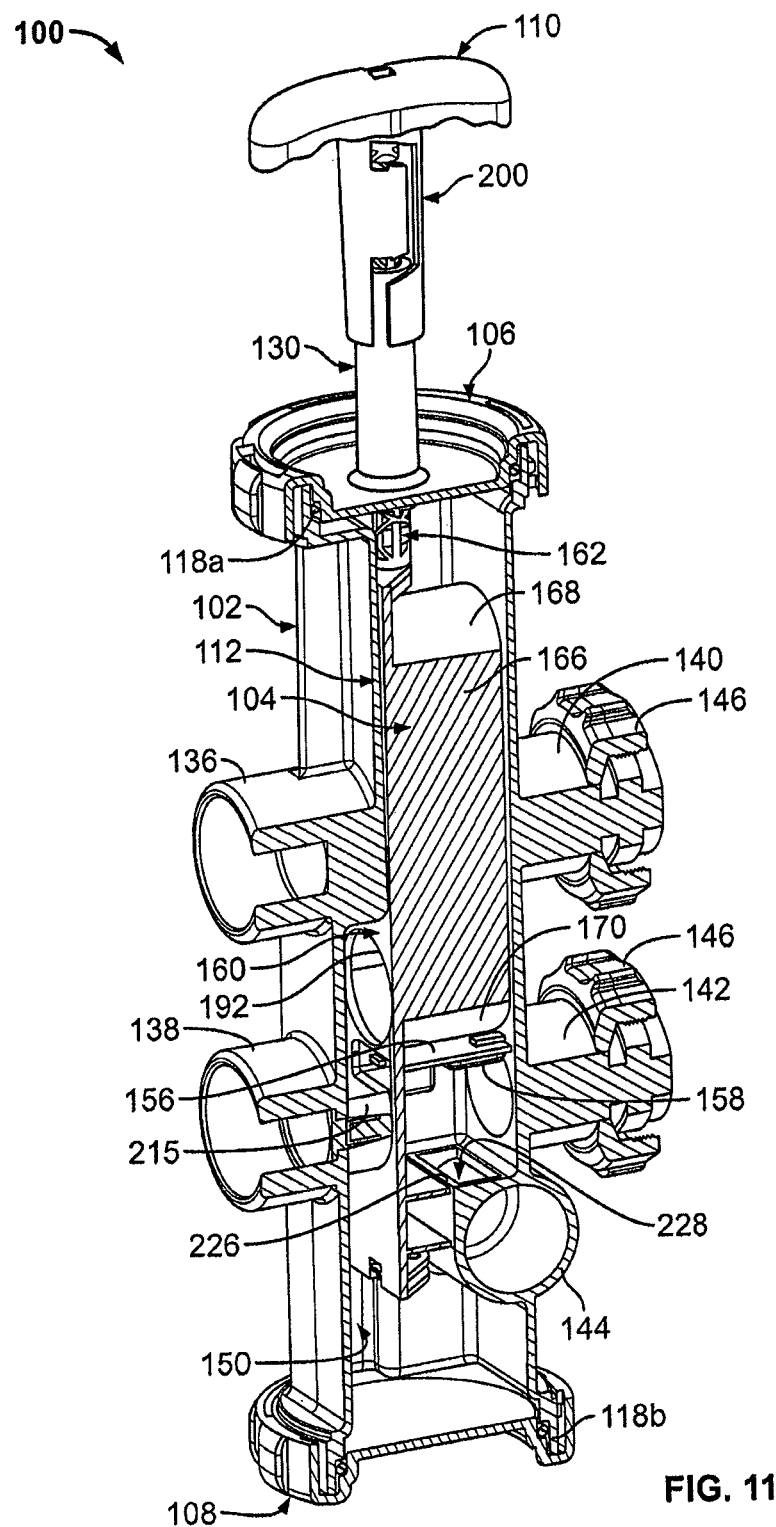
FIG. 11 is sectional view of the vertical slide valve of FIG. 3 taken along section line 11-11 of FIG. 5 and showing the slide valve in a backwash mode, and the waste port, in greater detail.
Figure 12:
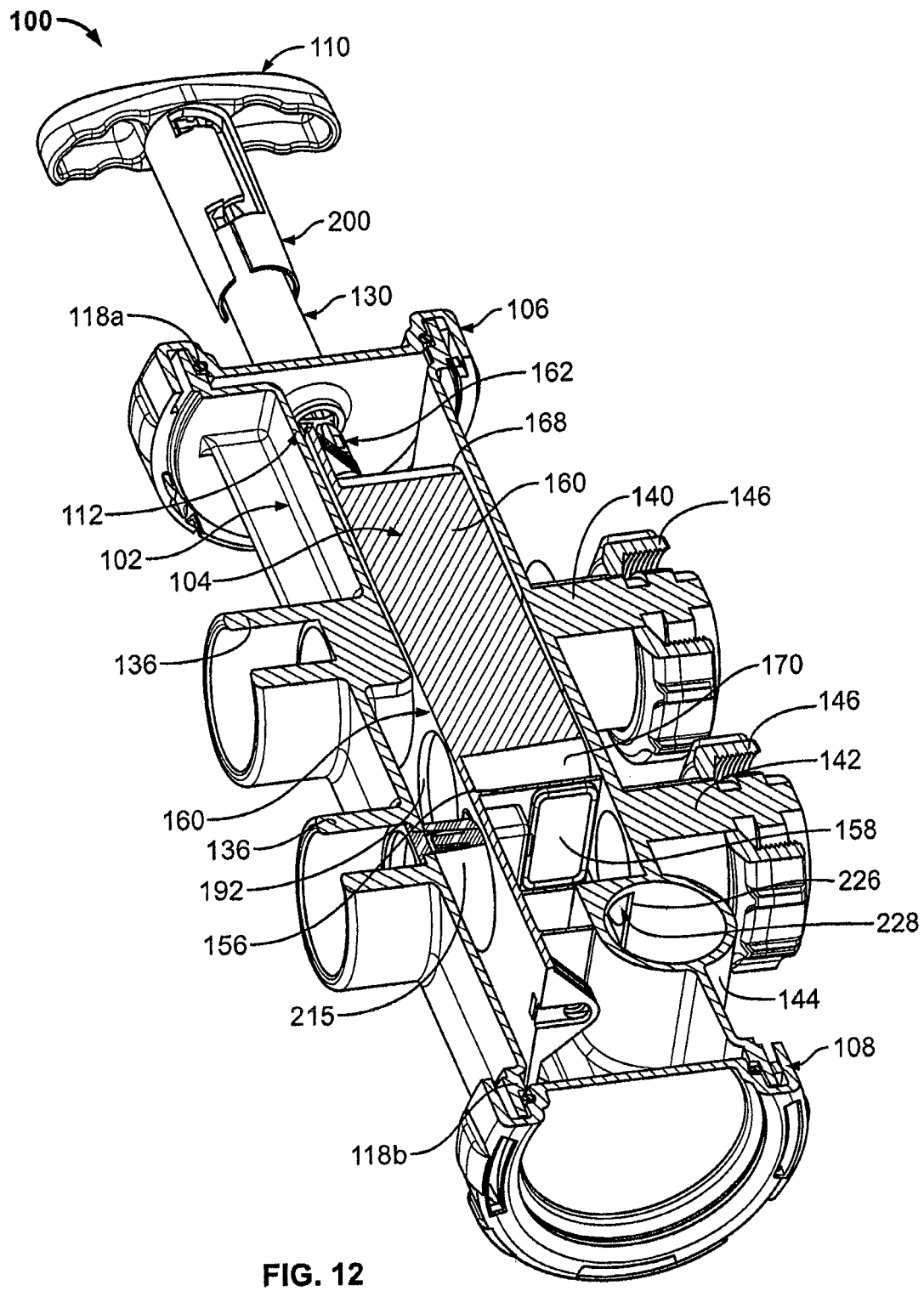
FIG. 12 is another sectional view of the vertical slide valve of FIG. 3 taken along section line 11-11 of FIG. 5 and showing the slide valve in a backwash mode, and the waste port gasket, in greater detail.

FIGS. 10-12 are sectional views of the vertical slide backwash valve 100 showing the interior of the vertical slide backwash valve 100 when in backwash mode. FIG. 10, is a sectional view of the vertical slide backwash valve 100 in backwash mode and taken along line 9/10-9/10 of FIG. 5. When the vertical slide backwash valve 100 is in backwash mode, the handle is pulled all the way up into the backwash position where the follower 134 is locked in the first locking well 210. Two flow paths are created. The first flow path G extends from the second pool port 138 to the first filter port 140. The second flow path H extends from the second filter port 142 and out through the discharge port 144.

When in backwash mode, the pool/spa water provided to the vertical sliding backwash valve 100 at the second pool port 138 by the pool or spa's water circulation system, flows along arrow G to the first filter port 140. That is, the water flow path is as follows: into the second pool port 138, through a portion of the third flow section 222, through the sliding gate second flow opening 192 and into the second chamber 178 of the sliding gate 104 (which is positioned within and spans the second flow section 220 and the first flow section 218), through the sliding gate open front 172, and to the first filter port 140. The water exits the vertical sliding backwash valve 100 at the first filter port 140, where it enters a filter. The water traverses the filter in a reverse manner to the filter mode, thus backwashing (removing) waste from the filter. This waste water is then returned to the vertical sliding backwash valve 100 at the second filter port 142 and flows along arrow H through the discharge opening 228 and to the discharge port 144. That is, the water flows into the filter pool port 142, to a portion of the third flow section 222, and to the discharge port 144. The water exits the vertical sliding backwash valve 100 from the discharge port 144, where it is removed from the pool/spa system. As such, when in backwash mode, the pool/spa water travels in two curved flow paths, e.g., arrows G and H. A pool filter is operated in filter mode for the majority of it's operational life, and is operated in backwash mode only a fraction of the time compared to operation in filter mode. However, because the filter is operated in backwash mode only a fraction of the time, it is unnecessary to maximize hydraulic efficiency when in backwash mode. The present disclosure advantageously provides for straight-through flow in filter mode.

Figure 13:
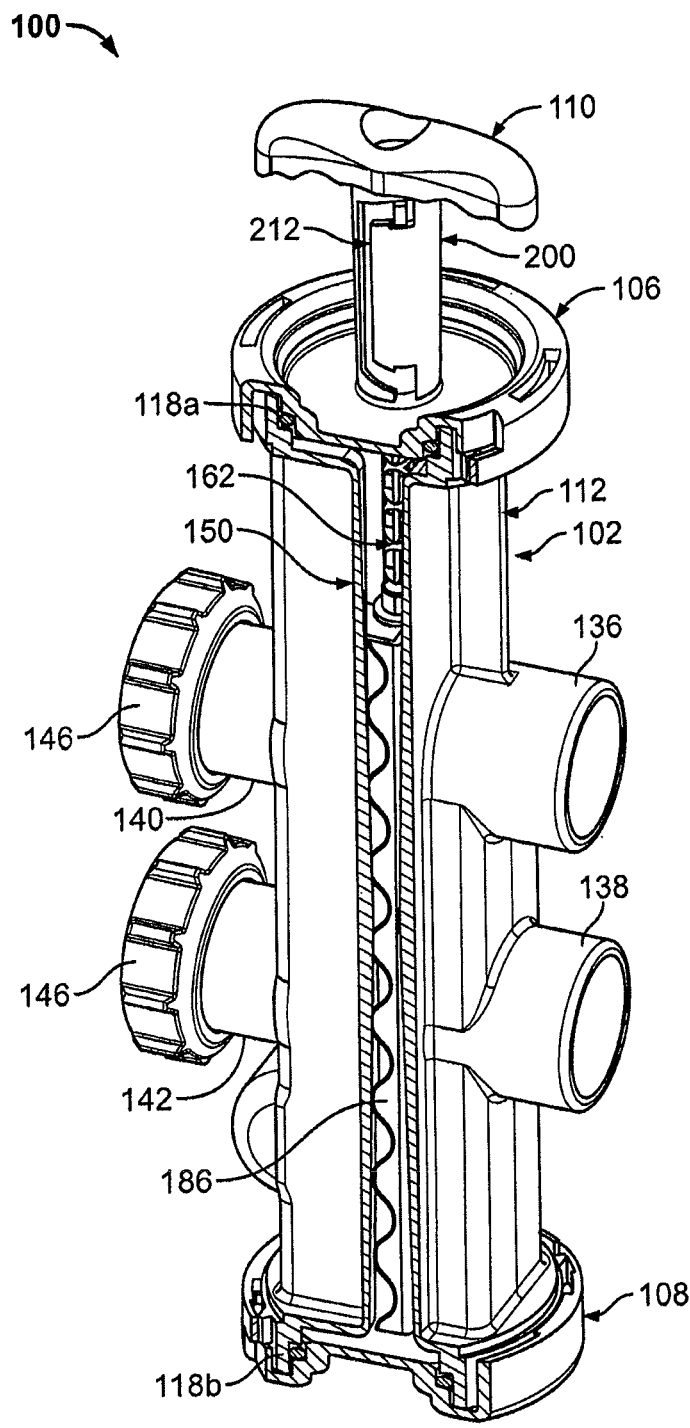
FIG. 13 is a partially sectional rear view of the vertical slide valve of FIG. 3 in a filter mode showing a sinusoidal geometry on the vertical sliding gate in greater detail.

FIG. 13 is a partially-sectioned view of the vertical slide backwash valve 100 of the present disclosure showing the first flange 186 in greater detail, with the understanding that the second flange 188 is similarly dimensioned. As mentioned previously, the first and second flanges 186, 188 are respectively positioned within the first and second channels 150, 152, and have a sinusoidal or scalloped design that includes a plurality of arcuate sections. When the sliding gate 104 is reciprocated between the filter mode and the backwash mode, the first and second flanges 186, 188 respectively slide within the first and second channels 150, 152, respectively. This movement can result in friction between the flanges 186, 188 and the channels 150, 152, respectively. The scalloped geometry of the flanges 186, 188 reduces the contact surface between the flanges 186, 188 and the channels 150, 152, resulting in reduced friction and wear. Further, the flanges 186, 188 and walls of the channels 150, 152 can, over time, accumulate and trap dirt, debris, filter media, or other foreign media. This trapped debris can cause undesired wear. The scalloped geometry of the flanges 186, 188 provides openings across the flanges 186, 188 through which the trapped dirt, debris, filter media, and other foreign media can escape and be washed from the system. Accordingly, the scalloped geometry of the flanges 186, 188 allows for the removal of trapped debris, resulting in reduced wear.

FIGS. 14-16 show the vertical slide backwash valve 100 in the second configuration, where the first end cap 106, the stem 162, and the handle 110 have been interchangeably "swapped" with the second end cap 108. FIG. 14 is a perspective view of the backwash valve 100, with the first end cap 106, sliding gate 104, and second end cap 108 reversed. That is, the second end cap 108 is secured to the first locking ring 118*a*, the sliding gate 104 is inserted into the second locking ring 118*b*, and the first end cap 106 is secured to the second locking ring 118*b*. In such an arrangement, the discharge port 144 is adjacent the first end cap 106, the second pool port 138 is "above" the first pool port 136, and the second filter port 142 is "above" the first filter port 140. Conversion of the configuration shown in FIGS. 3-13 to the configuration shown in FIGS. 14-16 may be desirable for applications where the filter's inlet is above the filter's outlet, which is typical for sand filters, as opposed to a DE filter where the filter's inlet is below the filter's outlet. Accordingly, this configuration will be referred to as the sand filter arrangement.

To construct the vertical slide backwash valve 100 in the sand filter arrangement of FIGS. 14-16, the o-ring 122 is positioned in the first locking ring 118a, and the second end cap 108 is positioned over the first locking ring 118a. The second end cap 108 is rotated so that the locking protuberances 128 engage and lock with the locking protrusions 120, securing the second end cap 108 with the first locking ring 118a. The stem 162 is connected with the sliding gate 104, such that the sliding gate connector 196 of the stem 162 engages the second stem mount 184 of the sliding gate 104. The first end cap 106 is positioned over the stem 162 so that the stem 162 extends through the hollow boss 130, and the handle connector 198 is exposed. The handle 110 is placed over the exposed stem 162 and pushed down until the handle connector 198 engages the handle 110. The handle 110 is placed over the hollow boss 130 so that the hollow boss 130 is inserted into the hollow shaft 200 and the follower 134 is inserted into the track entrance 208. A second o-ring 122 is positioned in the second locking ring 118b, and the sliding gate 104 is inserted into the valve body 102, such that the first flange 186 is inserted into the first channel 150, the second flange 188 is inserted into the second channel 152, and the gate body 154 is inserted through the second locking ring 118b into the central tube 112. The sliding gate 104 is inserted into the valve body 102 and the first end cap 106 is placed over the second locking ring 118b. The first end cap 106 is rotated so that the locking protuberances 128 engage and lock with the locking protrusions 120, securing the first end cap 106 with the second locking ring 118b. The flow collar 215 can be inserted into the second pool port 138 to essentially extend the second pool port 138 to the second flow opening 192 of the sliding gate 104. The flow collar 215 can include an annular lip that engages an internal shoulder of the second pool port 138, securing the flow collar 215 in place. When the vertical slide backwash valve 100 is fully constructed the sliding gate 104 can be reciprocated linearly within the valve body 102 by movement of the handle 110. In the second configuration, e.g., for a sand filter, the vertical slide backwash valve 100 is in backwash mode when the follower 134 is secured in the second well 214 and is in filter mode when the follower 134 is secured in the first well 210.

The vertical slide backwash valve 100 can be connected to a filter and pool circulation system. Particularly, the first and second pool ports 136, 138 can be connected to a pool/spa circulation system, e.g., a pump, while the first and second filter ports 140, 142 can be connected to a filter inlet and outlet. The second pool port 138 should be connected to the pool/spa circulation system outlet so that the pool/spa circulation system provides the second pool port 138 with water to be filtered. The second filter port 142 should be connected to the filter inlet so that it provides the filter with water to be filtered. The second filter port 142 can be secured to the filter inlet by the nut 146. The nut 146 is secured to the second filter port 142 by the nut retaining ring 148. The first filter port 140 should be connected to the filter outlet so that it receives filtered water from the filter to return to the pool/spa. The first filter port 140 can be secured to the filter inlet by a nut 146. The nut 146 is secured to the first filter port 140 by the nut retaining ring 148. The first pool port 136 should be connected to the pool/spa circulation system inlet so that the pool/spa circulation system receives filtered water from the first pool port 136.

FIG. 15 is a sectional view of the vertical slide backwash valve 100 in the second configuration (e.g., in a sand filter arrangement) showing the interior of the vertical slide backwash valve 100 when in backwash mode. When the vertical slide backwash valve 100 is in backwash mode, the handle is pushed down and the follower 134 is locked in the second locking well 214. Two flow paths are created. The first flow path I extends from the second pool port 138 to the first filter port 140. The second flow path J (see also FIG. 14) extends from the second filter port 142 to the discharge port 144.

When in backwash mode, pool/spa water is provided to the vertical sliding backwash valve 100 at the second pool port 138 by the pool or spa's water circulation system, and flows along arrow I to the first filter port 140. That is, the water flows into the second pool port 138, to a portion of the third flow section 222, in the sliding gate second flow opening 192, to the second chamber 178 of the sliding gate 104 (which is positioned within and spans the second flow section 220 and the first flow section 218), out the sliding gate open front 172, and to the first filter port 140. The water exits the vertical sliding backwash valve 100 at the first filter port 140, where it enters a filter. The water traverses the filter in a reverse manner to the filter mode, thus removing waste from the filter. This waste water is returned to the vertical sliding backwash valve 100 at the second filter port 142 and flows along arrow J through the discharge opening 228 and to the discharge port 144. That is, the water flows into the filter pool port 142, to a portion of the third flow section 222, and to the discharge port 144. The water exits the vertical sliding backwash valve 100 from the discharge port 144, where it is removed from the pool/spa system. As such, when in backwash mode, the pool/spa water travels in two curved flow paths, e.g., arrows I and J.

FIG. 16, is a sectional view of the vertical slide backwash valve 100 in the second configuration (e.g., in a sand filter arrangement) showing the interior of the vertical slide backwash valve 100 when in backwash mode. When the vertical slide backwash valve 100 is in filter mode, the handle is pulled up, causing the stem 162 to pull the sliding gate 104 within the central tube 112, until the gasket 158 engages the discharge port shoulder 226, and the follower 134 is locked in the first locking well 210. Two straight-through flow paths are formed. The first straight-through flow path K extends from the second pool port 138 to the second filter port 142. The second straight-through flow path L extends from the first pool port 136 to the first filter port 140. Each straight-through flow path provides for reduced pressure-drop as compared to an S-path, for example.

When in filter mode, pool/spa water is provided to the vertical sliding backwash valve 100 at the second pool port 138 by the pool or spa's water circulation system, and flows along arrow K to the second filter port 142. That is, the water flows into the second pool port 138, across the collar 215, in the sliding gate second flow opening 192, to the second chamber 178 of the sliding gate 104 (which is positioned within the third flow section 222), out the sliding gate open front 172, and to the second filter port 142. The water exits the vertical sliding backwash valve 100 at the second filter port 142, where it enters a filter. The water traverses the filter, where it is filtered, and is returned to the vertical sliding backwash valve 100 at the first filter port 140 and flow along arrow L to the first pool port 136. That is, the water flows into the first filter port 140, into the sliding gate open front 172, to the first chamber 176 of the sliding gate 104 (which is positioned within the first flow section 218), out the sliding gate first flow opening 190, and to the first pool port 136. The water exits the vertical sliding backwash valve 100 at the first pool port 136, where it is recirculated to the pool/spa. Water is substantially prevented from flowing between the first and second chambers 176, 178 because of the internal wall 180. Additionally, when in filter mode, the pool/spa water travels in two line-of-sight, or straight-through, flow paths, e.g., arrows K and L. The straight-through flow paths of arrows K and L provide hydraulic efficiency and minimal pressure-drop. Further, water does not leak from the waste outlet 144 due to the compression of the gasket 158 against the discharge port shoulder 226, which seals the discharge opening 228. Therefore, the gasket 158 engages and disengages the discharge port shoulder 226 via a linear movement that is in a direction normal to the discharge port shoulder 226. Accordingly, in contrast to the radial seal of the prior art backwash valve 4, the gasket 158 of the present disclosure is not required to slide across any surfaces. This results in an increased life expectancy of the gasket 158 and minimizes any need for lubricant. The gasket 158 is removably secured to the shelf gate 156 so that it can be replaced if it is ever damaged or worn.

Although the foregoing disclosure was discussed in connection with pools and spas, it is to be understood that the systems and methods disclosed herein could be utilized in connection with any body of water where sanitization is desired, e.g., fountains, ponds, water features, etc. Additionally, while the foregoing disclosure was discussed in connection with a filter, it is to be understood that the systems and methods disclosed herein could be utilized in connection with any application where fluid flow reversal is desirable.

It will be understood that the embodiments of the present invention described herein are merely exemplary and that a person skilled in the art may make many variations and modifications without departing from the spirit and the scope of the invention.

What is claimed is:

1. A backwash valve for reversing fluid flow comprising,
    a body comprising,
        a central tube extending from a first end to a second end along a length of the body,
        a first pool port and a first filter port axially aligned with one another at a first position along the length of the body,
        a second pool port and a second filter port axially aligned with one another at a second position along the length of the body, and
        a waste port; and
    a sliding gate including a stem connected to a gate body, the gate body comprising a first chamber and a second chamber, the second chamber separated from the first chamber by an internal wall; the sliding gate linearly reciprocable between a filter position wherein fluid communication is provided among the first filter port, the first chamber, and the first pool port and at least one of said first and second filter ports is a fluid exit from said backwash valve, and a backwash position wherein fluid communication is provided among the first filter port, the second fluid chamber, and the second pool port, and between the second filter port and the waste port, and said at least one of said first and second filter ports is a fluid return to said backwash valve.

2. The backwash valve of claim 1, wherein the backwash valve is reconfigurable between a first configuration wherein the sliding gate is movable from the filter position to the backwash position by sliding the stem along the length of the body in a first direction relative to the body, and a second configuration wherein the sliding gate is movable from the filter position to the backwash position by sliding the stem along the length of the body in a second direction relative to the body.

3. The backwash valve of claim 1, wherein the waste port is fluidly coupled to the second filter port via a discharge opening, the sliding gate provided with a shelf gate that blocks fluid flow through the discharge opening when the sliding gate is in the filter position.

4. The backwash valve of claim 3, the body further comprising a discharge port shoulder that defines the discharge opening, and the shelf gate comprising a gasket, wherein in the filter position the shelf gate engages the discharge port shoulder via a linear movement that is in a direction normal to the discharge port shoulder so that the gasket seals the discharge opening.

5. The backwash valve of claim 4, further comprising a handle connected to the stem, the handle including a locking well, wherein the gasket compressingly engages the discharge port shoulder when a follower is locked in the locking well.

6. The backwash valve of claim 1, the sliding gate comprising a faceplate including a first flow opening extending through the faceplate and fluidly coupled to the first chamber, a second flow opening extending through the faceplate and fluidly coupled to the second chamber, and a flange located on a longitudinal side of the faceplate, the flange including a sinusoidal or scalloped design.

7. The backwash valve of claim 1, further comprising a faceplate including a first stem mount proximate the first chamber and a second stem mount proximate the second chamber, wherein the stem includes a sliding gate connector configured to removably attach to the first stem mount and the second stem mount, and wherein, when the backwash valve is in a first configuration, the sliding gate connector is attached to the first stem mount and the sliding gate is movable from the filter position to the backwash position by sliding the stem along the length of the body in a first direction, and when the backwash valve is in a second configuration, the sliding gate connector is attached to the second stem mount and the sliding gate is movable from the filter position to the backwash position by sliding the stem along the length of the body in a second direction.

8. A backwash valve for reversing fluid flow comprising,
    a body comprising,
        a central tube extending from a first end to a second end along a length of the body,
        a first pool port and a first filter port axially aligned with one another at a first position along the length of the body,
        a second pool port and a second filter port axially aligned with one another at a second position along the length of the body, and
        a waste port; and
    a sliding gate including a stem removably connected to a gate body, the gate body comprising a first chamber and a second chamber, the second chamber separated from the first chamber by an internal wall; the sliding gate linearly reciprocable between a filter position wherein fluid communication is provided among the first filter port, the first chamber, and the first pool port, and at least one of said first and second filter ports is a fluid exit from said backwash valve, and a backwash position wherein fluid communication is provided among the first filter port, the second fluid chamber, and the second pool port, and between the second filter port and the waste and said at least one of said first and second filter ports is a fluid return to said backwash valve;
    wherein the backwash valve is reconfigurable between a first configuration wherein the sliding gate is movable from the filter position to the backwash position by sliding the stem along the length of the body in a first direction relative to the body, and a second configuration wherein the sliding gate is movable from the filter position to the backwash position by sliding the stem along the length of the body in a second direction relative to the body.

9. The backwash valve of claim 8, wherein the sliding gate includes a sliding gate connector, wherein in the first configuration the sliding gate connector is attached to a first end of the gate body, and in the second configuration the sliding gate connector is attached to a second end of the gate body.

10. The backwash valve of claim 8, wherein the waste port is fluidly coupled to the second filter port via a discharge opening, the sliding gate provided with a shelf gate for blocking fluid flow through the discharge opening when the sliding gate is in the filter position, the body further comprising a discharge port shoulder that defines the discharge opening, and the shelf gate comprising a gasket, wherein in the filter position the shelf gate engages the discharge port shoulder via a linear movement that is in a direction normal to the discharge port shoulder so that the gasket seals the discharge opening.

11. The backwash valve of claim 10, further comprising a handle connected to the stem, the handle including a locking well, wherein locking a follower in the locking well causes the gasket to compressingly engage the discharge port shoulder.

12. A backwash valve for reversing fluid flow comprising, a body including,
   a central tube extending from a first end to a second end along a length of the body,
   a first pool port and a first filter port axially aligned with one another at a first position along the length of the body,
   a second pool port and a second filter port axially aligned with one another at a second position along the length of the body, and
   a waste port; and
   a sliding gate linearly reciprocable along a length of the body between a filter position and a backwash position, the sliding gate including a stem connected to a gate body, the gate body comprising a top wall, a bottom wall, and two sidewalls defining a first chamber and a second chamber, the second chamber separated from the first chamber by an internal wall; wherein, in the filter position, (i) a first axial flow path is provided among the first filter port, the first chamber, and the first pool port, (ii) a second axial flow path is provided among the second filter port, the second chamber, and the second pool port, and (iii) said second filter port is a fluid exit from said backwash valve; and
   wherein, in the backwash position, the waste port is fluidly coupled to the second filter port via a discharge opening and said second filter port is a fluid return to said backwash valve.

13. The backwash valve of claim 12, the body further comprising a discharge port shoulder that defines the discharge opening, and wherein the sliding gate is provided with a shelf gate for engaging the discharge port shoulder in the filter position, the shelf gate comprising a gasket, wherein in the filter position the shelf gate engages the discharge port shoulder via a linear movement that is in a direction normal to the discharge port shoulder so that the gasket seals the discharge opening.

14. The backwash valve of claim 13, further comprising a handle connected to the stem, the handle including a locking well, wherein the gasket compressingly engages the discharge port shoulder when a follower is locked in the locking well.

15. The backwash valve of claim 12, wherein in the backwash position fluid flow is provided among the first filter port, the second fluid chamber, and the second pool port, and between the second filter port and the waste port, and wherein the backwash valve is reconfigurable between a first configuration, wherein the sliding gate is movable from the filter position to the backwash position by sliding the stem along the length of the body in a first direction relative to the body, and a second configuration, wherein the sliding gate is movable from the filter position to the backwash position by sliding the stem along the length of the body in a second direction relative to the body.

16. The backwash valve of claim 12, the sliding gate comprising a faceplate including a first flow opening extending through the faceplate and fluidly coupled to the first chamber, a second flow opening extending through the faceplate and fluidly coupled to the second chamber, and a flange located on a longitudinal side of the faceplate, the flange including a sinusoidal or scalloped design.

17. A backwash valve comprising,
   a body comprising,
      a central tube extending from a first end to a second end along a length of the body,
      a first pool port and a first filter port axially aligned with one another at a first position along the length of the body,
      a second pool port and a second filter port axially aligned with one another at a second position along the length of the body, and
      a waste port;
   a sliding gate including a stem connected to a gate body, the gate body comprising a first chamber and a second chamber, the second chamber separated from the first chamber by an internal wall; the sliding gate movable between a filter position wherein fluid communication is provided among the first filter port, the first chamber, and the first pool port, and a backwash position wherein fluid communication is provided among the first filter port, the second fluid chamber, and the second pool port, and between the second filter port and the waste port; and
   a first end cap and a second end cap, the first end cap comprising a hollow boss for allowing the stem to slide therethrough, the stem being slidable between an extended position, wherein a portion of the stem is located externally of the central tube, and a retracted position, wherein the portion of the stem is located internally within the central tube, and wherein the backwash valve is reconfigurable between a first configuration, wherein the first end cap is secured on the first end of the body and the sliding gate is in the filter position when the stem is in the retracted position, and a second configuration, wherein the first end cap is secured on the second end of the body and the sliding gate is in the filter position when the stem is in the extended position.

18. A backwash valve comprising,
   a body comprising,
      a central tube extending from a first end to a second end along a length of the body,
      a first pool port and a first filter port axially aligned with one another at a first position along the length of the body, a second pool port and a second filter port axially aligned with one another at a second position along the length of the body, and a waste port;

a sliding gate including a stem removably connected to a gate body, the gate body comprising a first chamber and a second chamber, the second chamber separated from the first chamber by an internal wall; the sliding gate movable between a filter position wherein fluid communication is provided among the first filter port, the first chamber, and the first pool port, and a backwash position wherein fluid communication is provided among the first filter port, the second fluid chamber, and the second pool port, and between the second filter port and the waste port, wherein the backwash valve is reconfigurable between a first configuration wherein the sliding gate is movable from the filter position to the backwash position by sliding the stem along the length of the body in a first direction relative to the body, and a second configuration wherein the sliding gate is movable from the filter position to the backwash position by sliding the stem along the length of the body in a second direction relative to the body; and a first end cap and a second end cap, the first end cap comprising a hollow boss for allowing the stem to slide therethrough, the stem being slidable between an extended position, wherein a portion of the stem is located externally of the central tube, and a retracted position, wherein the portion of the stem is located internally within the central tube, and wherein the backwash valve is reconfigurable between the first configuration, wherein the first end cap is secured on the first end of the body and the sliding gate is in the filter position when the stem is in the retracted position, and the second configuration, wherein the first end cap is secured on the second end of the body and the sliding gate is in the filter position when the stem is in the extended position.

19. A backwash valve comprising, a body including, a central tube extending from a first end to a second end along a length of the body, a first pool port and a first filter port axially aligned with one another at a first position along the length of the body, a second pool port and a second filter port axially aligned with one another at a second position along the length of the body, and a waste port;

a sliding gate slideable along a length of the body between a filter position and a backwash position, the sliding gate including a stem connected to a gate body, the gate body comprising a top wall, a bottom wall, and two sidewalls defining a first chamber and a second chamber, the second chamber separated from the first chamber by an internal wall; wherein, in the filter position, (i) a first axial flow path is provided among the first filter port, the first chamber, and the first pool port, and (ii) a second axial flow path is provided among the second filter port, the second chamber, and the second pool port; and wherein, in the backwash position, the waste port is fluidly coupled to the second filter port via a discharge opening; and a first end cap and a second end cap, the first end cap comprising a hollow boss for allowing the stem to slide therethrough, the stem being slidable between an extended position, wherein a portion of the stem is located externally of the central tube, and a retracted position, wherein the portion of the stem is located internally within the central tube, and wherein the backwash valve is reconfigurable between a first configuration, wherein the first end cap is secured on the first end of the body and the sliding gate is in the filter position when the stem is in the retracted position, and a second configuration, wherein the first end cap is secured on the second end of the body and the sliding gate is in the filter position when the stem is in the extended position.

20. The backwash valve of claim 19, wherein the sliding gate includes a sliding gate connector, wherein in the first configuration the sliding gate connector is attached to a first end of the gate body, and in the second configuration the sliding gate connector is attached to a second end of the gate body.

* * * * *